US008442107B2

(12) United States Patent
Cho et al.

(10) Patent No.: US 8,442,107 B2
(45) Date of Patent: May 14, 2013

(54) MEMORY MAPPING APPARATUS AND METHOD FOR VIDEO DECODER/ENCODER

(75) Inventors: Daesung Cho, Seoul (KR); Sangjo Lee, Suwon-si (KR); Doohyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1597 days.

(21) Appl. No.: 11/068,969

(22) Filed: Mar. 2, 2005

(65) Prior Publication Data

US 2006/0023792 A1    Feb. 2, 2006

(30) Foreign Application Priority Data

Jul. 28, 2004   (KR) .................... 10-2004-0059193

(51) Int. Cl.
 *H04N 7/12*   (2006.01)
(52) U.S. Cl.
 USPC ............. 375/240.01; 375/240.02; 375/240.26
(58) Field of Classification Search ............. 375/240.01, 375/240.02, 240.26
 See application file for complete search history.

(56) References Cited

U.S. PATENT DOCUMENTS

| | | | | |
|---|---|---|---|---|
| 4,183,058 | A | * | 1/1980 | Taylor ...................... 365/189.02 |
| 5,442,402 | A | | 8/1995 | Sohn et al. |
| 5,581,310 | A | * | 12/1996 | Vinekar et al. ................ 348/718 |
| 6,297,857 | B1 | | 10/2001 | Jones et al. |
| 6,301,299 | B1 | | 10/2001 | Sita et al. |
| 6,356,962 | B1 | * | 3/2002 | Kasper ............................ 710/29 |

FOREIGN PATENT DOCUMENTS

| | | |
|---|---|---|
| JP | 10-191236 | 7/1998 |
| JP | 11-298857 | 10/1999 |
| KR | 10-0260475 | 7/2000 |

OTHER PUBLICATIONS

"Interleaved Memory," University of Maryland, Dept. Of Computer Science, Online! Jul. 8, 2003, XP-002353885, Retrieved from the Internet: URL: http://web.archive.org/web/20030708194814/http://www.cs.umd.edu/class/spring2003/cmc311/Notes/Memory/interleaved.html.
European Search Report issued by the European Patent Office on Nov. 15, 2005 for corresponding European Application No. EP 05 25 0305.
Korean Office Action for corresponding Korean Patent Application No. 10-2004-0059193 dated Apr. 19, 2006.
Japanese Non-Final Rejection Office Action dated Jul. 5, 2011, from Japanese Patent Application No. 2005-218214.
Japanese Office Action issued Jun. 5, 2012 issued in corresponding Japanese Patent Application No. 2005-218214.

* cited by examiner

*Primary Examiner* — Sath V Perungavoor
*Assistant Examiner* — Geepy Pe
(74) *Attorney, Agent, or Firm* — Staas & Halsey LLP

(57) ABSTRACT

A memory mapping apparatus and a method in a video decoder/encoder utilize a dividing unit, a storage unit and a memory allocation unit. The dividing unit divides picture data into macroblocks and divides each of the macroblocks, which are units of encoding, into partitions having a predetermined size. A storage unit comprises at least one memory bank which is independently accessible. A memory allocation unit allocates adjacent partitions to different memory banks. Accordingly, a total number of cycles necessary to read and write the picture data is reduced.

24 Claims, 20 Drawing Sheets

PICTURE

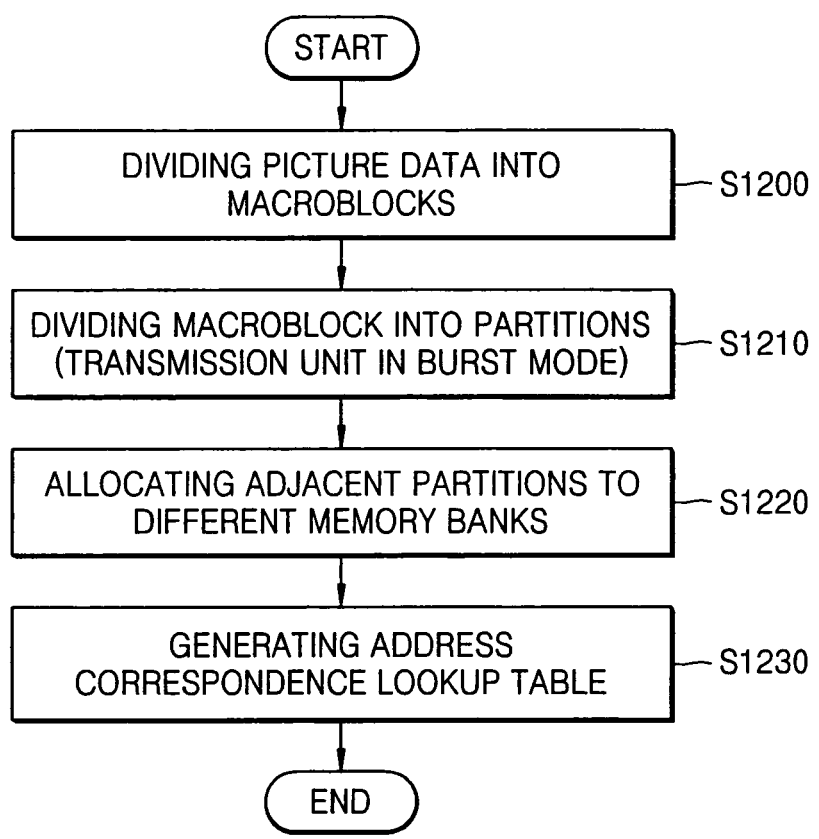

4x4 PARTITION(FRAME)
: 6BLOCK OVERLAPPED IN WORST CASE 0-1-2-3-4-6
0-1-2-3-0-2 ← BANK SWITCHING

LATENCY 6CYCLES+6x4CYCLES=30CYCLES

4x4 PARTITION(FIELD)
: 12BLOCK OVERLAPPED IN WORST CASE 0-1-2-3-4-6-0-1-2-3-4-6
0-1-2-3-0-2-0-1-2-3-0-2
← BANK SWITCHING

LATENCY 6CYCLES+12x4CYCLES=54CYCLES

4x4 PARTITION(FRAME)
: 6BLOCK OVERLAPPED IN WORST CASE 0-1-2-3-4-5-0-1-2-3-4-5
0-1-2-3-0-1-0-1-2-3-0-1
← BANK SWITCHING

LATENCY 6CYCLES+12x4 CYCLES=54CYCLES

4x4 PARTITION(FIELD)
: 6BLOCK OVERLAPPED IN WORST CASE

EVEN FIELD:
0-2-4-0-2-4
0-2-0-0-2-0 ← BANK SWITCHING

ODD FIELD:
1-3-5-1-3-5
1-3-1-1-3-1 ← BANK SWITCHING

LATENCY 6x2CYCLES+6x4 CYCLES=36CYCLES

FIG. 24

| PARTITION | THE PRIOR ART | THE INVENTION |
|---|---|---|
| 4x4 | 81 | 42 |
| 8x4 | 81 | 54 |
| 4x8 | 117 | 42 |
| 8x8 | 117 | 54 |
| 16x8 | 117 | 62 |
| 8x16 | 189 | 70 |
| 16x16 | 189 | 78 |

_US 8,442,107 B2_

MEMORY MAPPING APPARATUS AND METHOD FOR VIDEO DECODER/ENCODER

CROSS-REFERENCE TO RELATED APPLICATIONS

This application claims the priority of Korean Patent Application No. 2004-59193, filed on Jul. 28, 2004, in the Korean Intellectual Property Office, the disclosure of which is incorporated herein in its entirety by reference.

BACKGROUND OF THE INVENTION

1. Field of the Invention

The present invention relates to a memory mapping apparatus and method in a video decoder/encoder, and more particularly, to a memory mapping apparatus and method using an independently-accessible memory bank structure.

2. Description of the Related Art

H.264/AVC is a standard recommended by Joint Video Team (JVT) that has performed a cooperative project of ISO/IEC MPEG and ITU-T VCEG (see "Text of ISO/IEC FDIS 14496-10: Information Technology—Coding of audio-visual objects—Part 10: Advanced Video Coding", ISO/IEC JTC 1/SC 29/WG 11.n5555, March 2003).

FIG. 1 is a schematic block diagram showing a decoder according to the H.264/AVC standard.

In order to speed up the decoder, an entropy decoder (P1) 105, a prediction unit (P2) 110, and a de-block filter (P3) 115 are connected with a pipeline constructed in units of a macroblock. A RISC core (P0) 100 performs controlling over the pipeline constructed in units of a macroblock and parsing of header information of picture data.

There are two buses used for the H.264/AVC codex. The one is an external bus 135 connecting an external buffer (not shown), the RISC core (P0) 100, the prediction unit (P2) 110, and the de-block filter (P3) 115. The other is an internal bus 130 connecting the modules (P0 to P3) 100, 105, 110, 115 and an on-chip SRAM 120. In addition, a parser buffer 140 and a PCI unit 145 are connected to the internal bus 130.

Each of the RISC core (P0) 100 and other modules (P1 to P3) 105, 110, 115 serves as a bus master, so that a wrapper having the bus master for the connected buses is needed. The RISC core (P0) 100 is directly connected to an instruction SRAM (INSTR. SRAM) 155.

Now, operations of the decoder according to the H.264/AVC standard will be described.

A network abstraction layer (NAL) video bit stream is input through a PCI slave interface. The NAL video bit stream is divided into plural pieces of data having a desired size by the RISC core (P0) 100, subjected to entropy-decoding by the entropy decoder (P1) 105, and stored in the parser buffer 140. In order to speed up data processing, the RISC core (P0) 100 and the entropy decoder (P1) 105 store the plural pieces of data in separate parser buffers.

The parser buffer 140 has a size suitable for decoding one macroblock. The data stored in the parser buffer 140 is read in units of a macroblock by the entropy decoder (P1) 105 and subjected to parsing in units of a syntax.

The parsing mainly comprises context adaptive variable length decoding (CAVLD) and context adaptive binary arithmetic decoding (CABAD). A unit for performing CAVLD, that is, a CAVLD unit, supports an Exp-Golomb code operation in the parsing of the RISC core (P0) 100. The data decoded by the entropy decoder (P1) 105 is transferred to the prediction unit (P2) 110. The entropy decoder (P1) 105 and the prediction unit (P2) 110 transmit and receive data through a dual on-chip SRAM 107 disposed therebetween, so that the internal bus 130 isn't used for data transmission therebetween. The entropy decoder (P1) 105 accesses an on-chip SRAM 120 via the internal bus 130 to acquire necessary information during the entropy-decoding. In general, the on-chip SRAM 120 has a size of about 16 KB.

The prediction unit (P2) 110 receives data stored in the dual on-chip SRAM 107 and data from an external bus of a memory controller 125. The prediction unit (P2) 110 uses a relatively wide bandwidth to access data of the external buffer 140. That is, to perform data processing in real time, the prediction unit (P2) 110 needs to access a large amount of data simultaneously. In particular, in the H.264/AVC codex, a larger amount of data needs to be accessed than in other conventional video standards.

After the prediction, the data stored in a dual on-chip SRAM 112 is transmitted to the de-block filter (P3) 115. The de-block filter (P3) 115 calculates a filter coefficient used to reduce a block effect on the restored data obtained from the prediction unit (P2) 110, and stores the calculation result in an SRAM. The calculation result stored in the SRAM is again stored in an external buffer. The transmission of the calculation result stored in the SRAM to the external buffer may be sent using an independent pipeline.

FIG. 2 shows macroblock and sub-macroblock partitions which are used as units for the prediction.

Referring to FIGS. 1 and 2, the prediction unit (P2) 110 performs prediction in various units of block sizes ranging from a 4×4-byte (minimum-size) partition to a 16×16-byte partition. For example, the sub-macroblock is a 8×8-byte block obtained by dividing the macroblock in units of a 8×8-byte partition. If necessary, the prediction unit (P2) 110 may divide the sub-macroblock into units of an 8×4-byte, 4×8-byte, or 4×4-byte partition used for prediction.

In the H.264 codex, the prediction unit (P2) 110 uses a 6-tap filter and a bilinear interpolation filter for luma and chroma data, respectively, so that boundary data, as well as the partition data, is required to be read from the external buffer.

In the case of the prediction unit (P2) 110 performing motion prediction in units of a 4×4-byte block, a data access amount further increases, in comparison with cases of performing motion prediction, in units of a 16×16-byte or 8×8-byte block. Therefore, in the case of performing inter-prediction, it is important to perform memory management effectively when the data is read from the external buffer.

FIGS. 3A to 3C show timing diagrams in a burst mode.

In the burst mode, that is, in a consecutive recording/reproducing scheme, a large amount of data is simultaneously read from the external buffer through direct memory access (DMA) 150, so that bus usage efficiency may be improved.

If a 64-bit (8-byte) data bus is used, FIG. 3A shows a timing diagram to access 64-bit data once; FIG. 3B shows a timing diagram to access 64-bit data four times consecutively; and FIG. 3C shows a timing diagram to access 64-bit data eight times consecutively. To use the burst mode in these cases of FIGS. 3B and 3C, a data block to be read or written needs to be consecutively located.

If an address of the external buffer where data is stored is requested, the memory controller 125 accesses the data corresponding to the request address, and consecutively accesses the next data corresponding to the next address, which is the request address plus 64 bits, because the data and the next data are consecutively located.

In these cases of FIGS. 3A to 3C, if an address where to-be-accessed data is stored is requested, the memory controller 125 accesses the corresponding data after a predetermined latency. As a result, in the cases of FIGS. 3B and 3C, it takes less time to access the same amount of data than in the case of FIG. 3A because the amount of the latency that occurs in the access of the saved amount of data is less in the cases of FIGS. 3B and 3C than in the case of FIG. 3A.

Assuming that a latency of a particular external buffer and a time interval taken to access 64-bit data are 6 cycles and 1 cycle, respectively, the total time intervals taken to access data in the cases of FIGS. 3A to 3C are 7 cycles (for 64 bits), 10 cycles (for 64×4=256 bits), and 14 cycles (for 64×8=512 bits), respectively. If 512-bit data is accessed by using the method of FIG. 3A, a time interval of 56 (=7×8) cycles is taken. However, by using the method of FIG. 3B, a time interval of 20 (=10×2) cycles is taken to access the 512-bit data. Therefore, it is possible to improve the bus usage efficiency by consecutively accessing data blocks after one address request.

In general, if data of an external buffer is read through the DMA in the burst mode, a large amount of data may be efficiently read at one time or for the same number of cycles. However, since there is a limitation in the data amount consecutively readable after one-time address allocation, the bus usage efficiency may still be lowered due to the latency involved in accessing data, even in a case where the burst mode is used. In addition, since data is accessed in units of a block, continuity of data is not ensured, so that it is difficult to use the burst mode efficiently.

FIGS. 4 to 6 show a conventional method of storing picture data in a memory and accessing the memory.

More specifically, FIG. 4 shows an operation of storing the picture data in the memory. The picture data having a size of M×N bytes is read in a raster scan scheme and sequentially stored in the memory.

FIG. 5 shows an operation of accessing particular regions of the picture data in the memory of FIG. 4. When a first block is accessed, since memory locations corresponding to the lines in the blocks are not adjacent to each other, a new address is requested every time that data corresponding to each of the lines is read, so that a large number of latencies occur.

FIG. 6 shows a timing diagram to access particular regions of the picture data in the memory. The latency occurs every time that data corresponding to the each of the lines is read. Therefore, in the case of accessing the picture data of 16×16 macroblocks, 16 latencies occur.

SUMMARY OF THE INVENTION

The present invention provides a memory mapping apparatus and method in a video decoder/encoder to reduce a total number of cycles necessary to read or write picture data from or to a memory by using an independently-accessible memory bank structure.

The present invention also provides a memory mapping apparatus and method in a video decoder/encoder to reduce a total number of cycles necessary to read or write picture data from or to a memory by separately applying a frame or a field memory mapping according to encoding schemes for the picture data.

According to an aspect of the present invention, a memory mapping apparatus in a video decoder/encoder, comprises: a dividing unit dividing picture data into macroblocks and dividing each of the macroblocks into partitions having a predetermined size, the macroblock being a unit of encoding; a storage unit comprising at least more than one memory bank, each of the memory banks being independently accessible; and a memory allocation unit allocating adjacent partitions to different memory banks.

According to another aspect of the present invention, a memory mapping apparatus in a video decoder/encoder, comprises: a storage unit comprising at least more than one memory bank, each of the memory banks being independently accessible; a memory allocation unit allocating adjacent partitions constituting macroblocks of picture data to different memory banks and generating and managing an address correspondence lookup table representing a correspondence between the partitions and addresses of the memory banks; and an address generation unit determining positions of the macroblocks and partitions where data of a predetermined position of the picture data belongs and generating addresses of the memory banks where the data of the predetermined positions is stored, based on the positions of the macroblocks and partitions with reference to the address correspondence lookup table.

According to another aspect of the present invention, a memory mapping apparatus in a video decoder/encoder, comprises: an encoding scheme determination unit determining that an encoding scheme for picture data in accordance with a frame or a field encoding scheme; a dividing unit dividing the picture data into macroblocks which are units of encoding, dividing each of the macroblocks into frame partitions if the encoding scheme is the frame encoding scheme, and dividing each of the macroblocks into field partitions if the encoding scheme is the field encoding scheme; a storage unit comprising at least more than one memory bank, each of the memory banks being independently accessible; and a memory allocation unit allocating adjacent partitions to different memory banks.

According to another aspect of the present invention a memory mapping method in a video decoder/encoder, comprises: dividing picture data into macroblocks, the macroblocks being units of encoding; dividing each of the macroblocks into partitions having a predetermined size; allocating adjacent partitions into different memory banks out of at least more than one memory bank, each of the memory banks being independently accessible; and generating and managing an address correspondence lookup table representing a correspondence between the partitions and addresses of the memory banks.

According to another aspect of the present invention, a memory mapping method in a decoder/encoder, comprises: allocating adjacent partitions constituting macroblocks of picture data to different memory banks, each of the memory banks being independently accessible; generating and managing an address correspondence lookup table representing a correspondence between the partitions and addresses of the memory banks; and determining positions of the macroblocks and partitions where data of predetermined positions of the picture data belongs and generating addresses of the memory banks where the data of the predetermined positions is stored based on the positions of the macroblocks and partitions with reference to the address correspondence lookup table.

According to another aspect of the present invention, a memory mapping method in a decoder/encoder, comprises: determining that an encoding scheme for picture data is a frame or a field encoding scheme; dividing the picture data into macroblocks which is a unit of encoding, dividing each of the macroblocks into frame partitions if the encoding scheme is the frame encoding scheme, and dividing each of the macroblocks into field partitions if the encoding scheme is the field encoding scheme; and allocating adjacent partitions to different memory banks.

Accordingly, a total number of cycles necessary to read and write the picture data is reduced.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 12 and 13 are flowcharts showing examples of a memory mapping method according to an embodiment of the present invention;

FIG. 24 show a comparison of a memory mapping method according to an embodiment of the present invention with a conventional memory mapping method in terms of the total number of cycles necessary to perform motion prediction compensation.

DETAILED DESCRIPTION OF THE PREFERRED EMBODIMENTS

Figure 1:
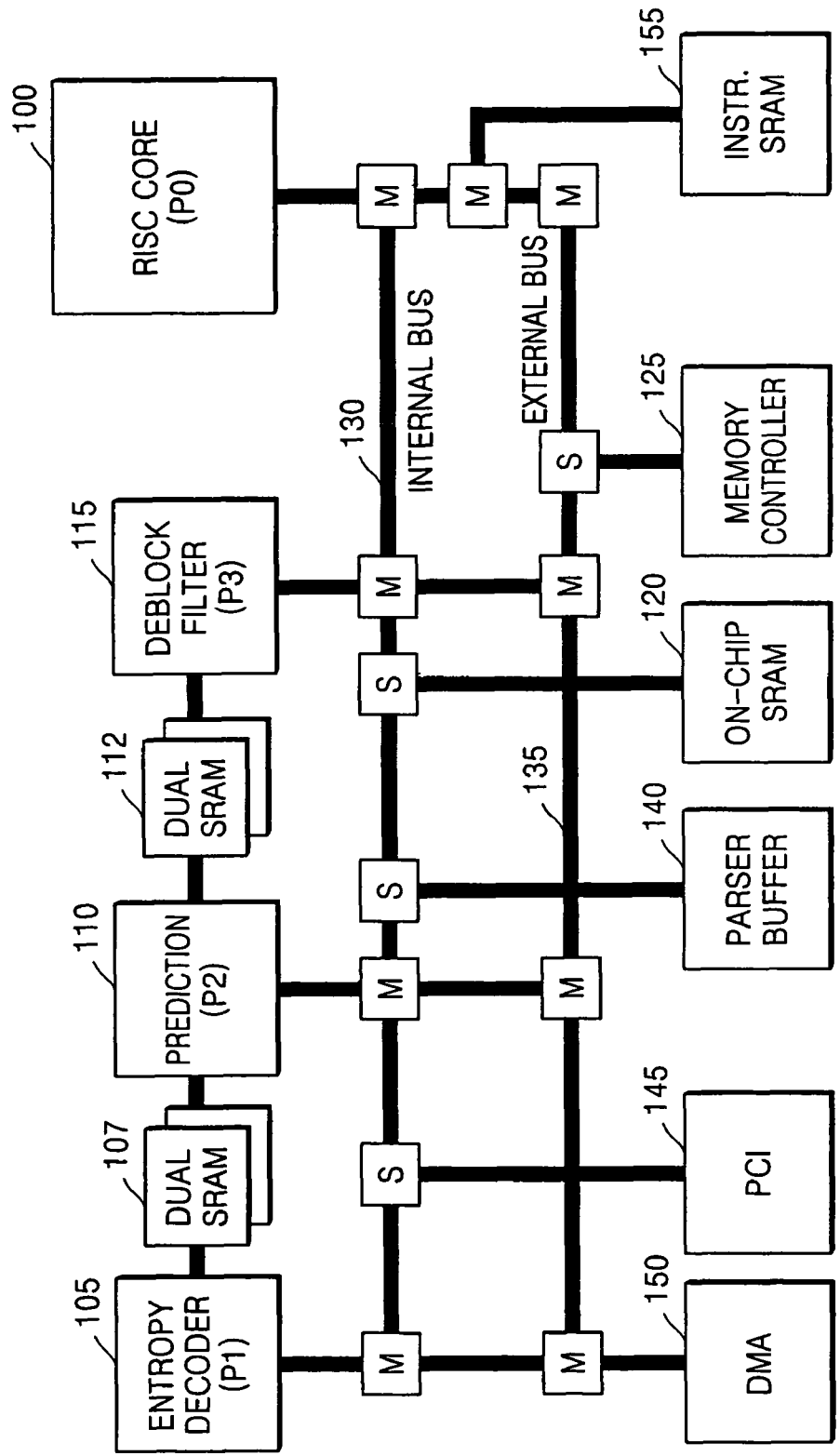
FIG. 1 is a schematic block diagram showing a decoder according to the H.264/AVC standard.

Reference will now be made in detail to the embodiments of the present invention, examples of which are illustrated in the accompanying drawings, wherein like reference numerals refer to the like elements throughout. The embodiments are described below to explain the present invention by referring to the figures.

Now, a memory mapping apparatus and method in a video decoder/encoder will be described in detail with reference to the accompanying drawings.

Figure 7:
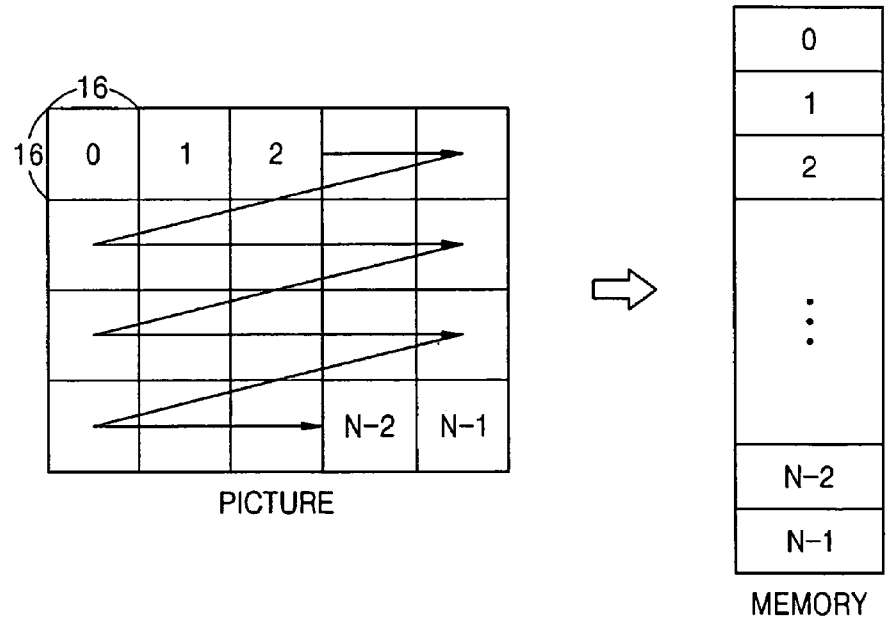
FIGS. 7 and 8 show an example of a memory mapping method according to an embodiment of the present invention.
Figure 8:
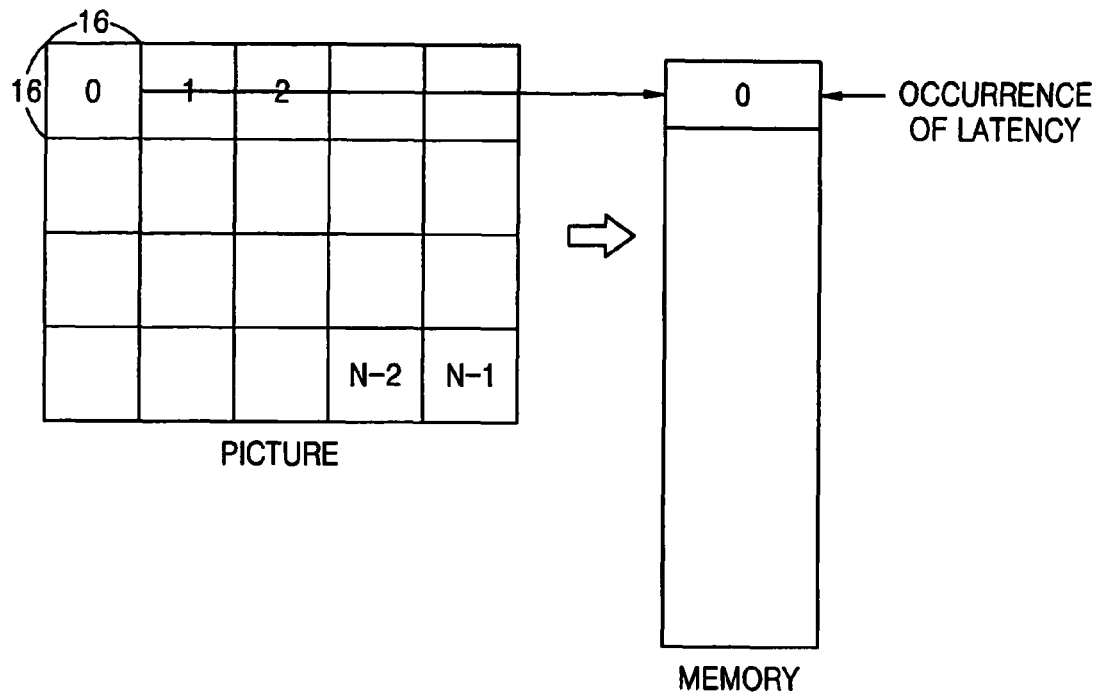

FIGS. 7 and 8 show an example of a memory mapping method according to an embodiment of the present invention. Referring to FIG. 7, picture data is divided into macroblocks, which are used as a unit of encoding. Typically, the macroblock has a size of 16×16 bytes. In the memory mapping method according to an embodiment of the present invention, the picture data is scanned in units of a macroblock. Next, the macroblocks are sequentially mapped into a memory. More specifically, the picture data in a first macroblock is scanned and the obtained data is mapped into a first position of the memory. Next, the picture data in a second macroblock is scanned and the obtained data is mapped into a second position of the memory. These processes are performed until the picture data in a final macroblock is scanned, and the obtained data is mapped into a final position of the memory.

Figure 4:
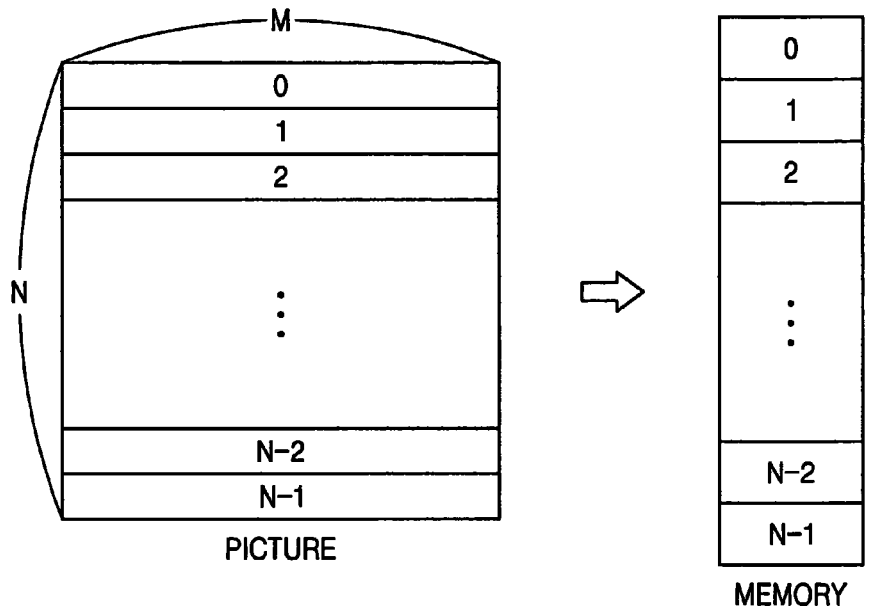
FIGS. 4 to 6 show a conventional method of storing picture data in a memory and accessing the memory.
Figure 5:
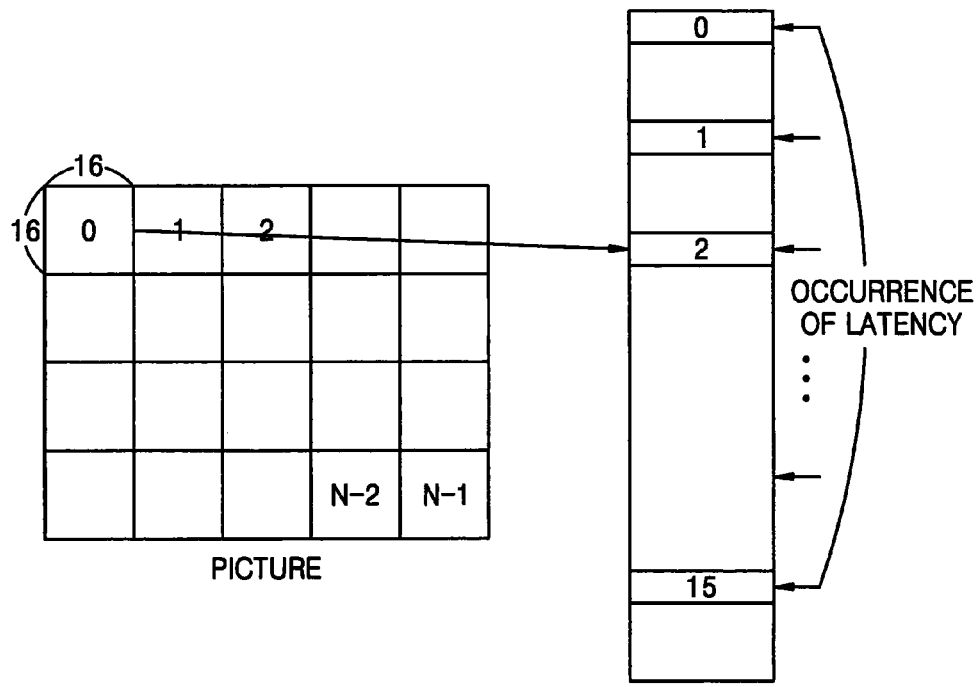

Referring to FIG. 8, according to the memory mapping method shown in FIG. 7, the picture data in one memory block may be read from the memory after a one-time latency, unlike the conventional memory mapping methods shown in FIGS. 4 and 5. Therefore, according to the memory mapping method, data buses may be used efficiently. In addition, a larger amount of data may be accessed during the same time interval than an amount of date accessible by the conventional memory mapping methods. In other words, according to the memory mapping method shown in FIG. 8, all the macroblocks may be accessed in a one-time burst mode.

Figure 3A:
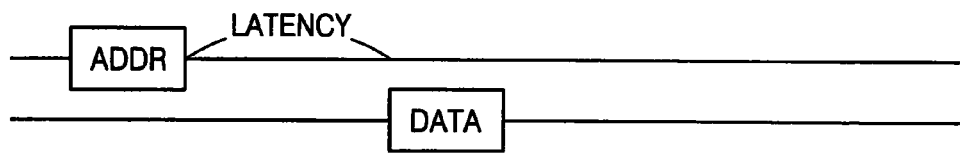
FIGS. 3A to 3C show timing diagrams in a burst mode.
Figure 3B:
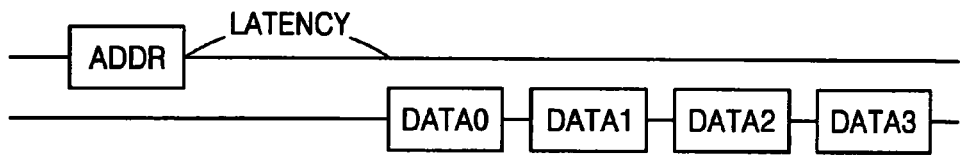
Figure 3C:
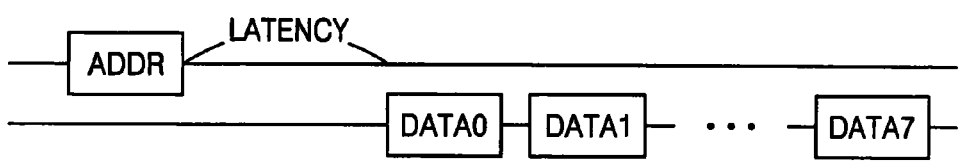

However, in a case where a 64-bit bus is used in the burst mode and the 16×16-byte macroblocks are read form the memory in the burst modes shown in FIGS. 3b and 3c, an additional latency occurs.

First, in a case of using the burst mode shown in FIG. 3B, a size of accessible data in a one-time burst mode is 32 bytes (8×4 bytes), so that 8(=(16×16)/32) latencies occur when all the 16×16-byte macroblocks are read.

On the other hand, in a case of using the burst mode shown in FIG. 3C, a size of accessible data in a one-time burst mode is 64 bytes (8×8 bytes), so that 4(=(16×16)/64) latencies occur when all the macroblocks are read. To prevent such additional latencies, a memory mapping and an accessing method shown in FIGS. 9, 10A and 10B are provided.

Figure 9:
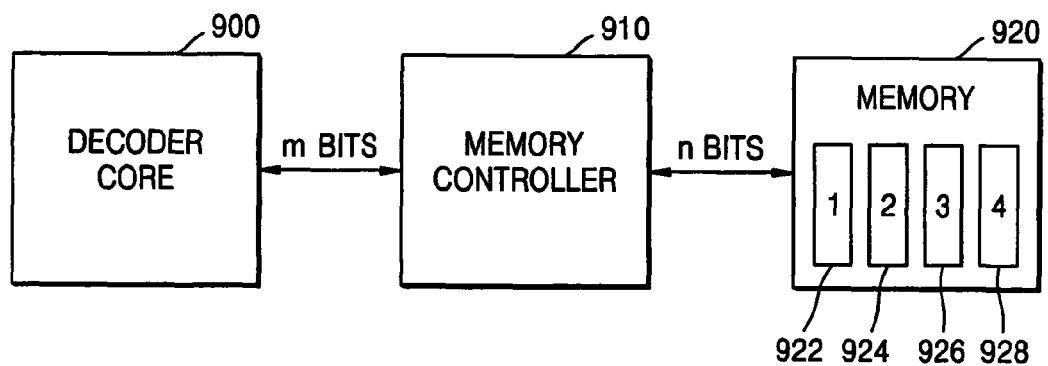
FIGS. 9, 10A and 10B show a memory mapping and accessing method using an interleaved memory structure.
Figure 10A:
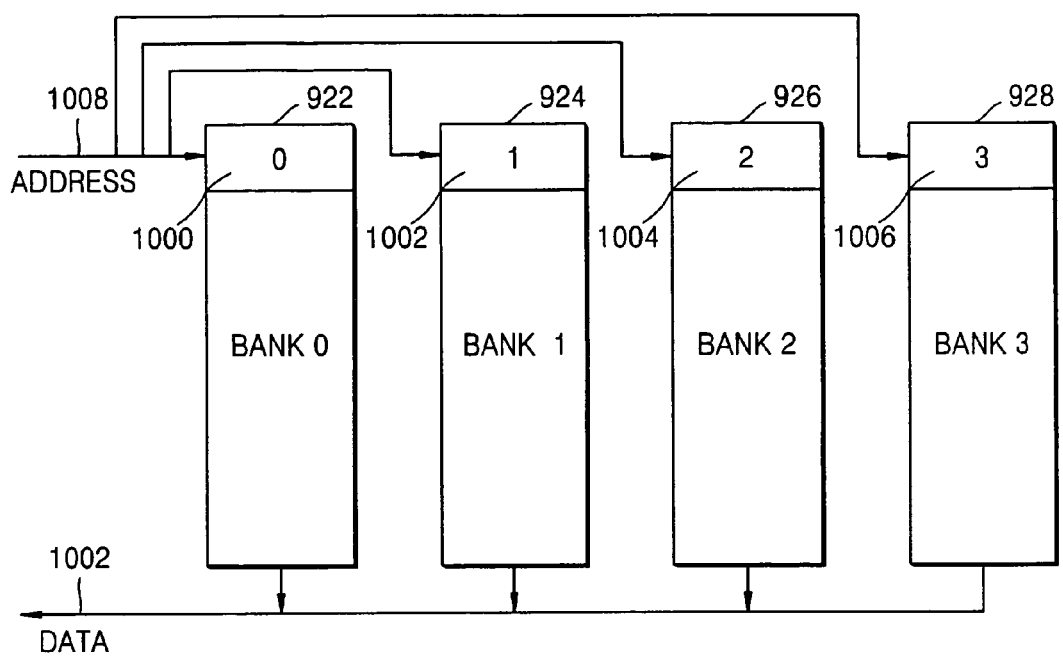
Figure 10B:
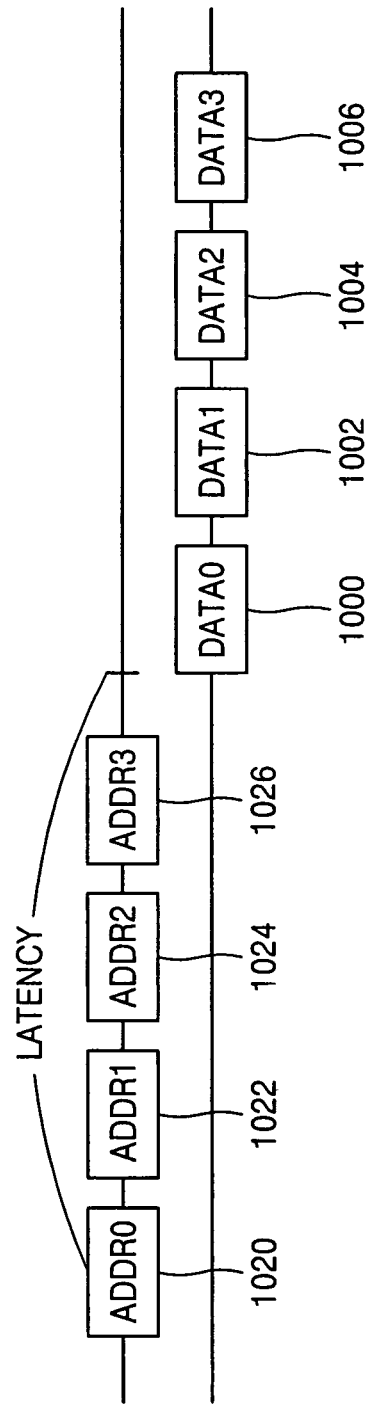

FIGS. 9, 10A and 10B show a memory mapping and an accessing method using an interleaved memory structure.

A memory 920 comprises 4 memory banks 922, 924, 926, and 928 having independent address accessing structures. A decoder core 900 and a memory controller 910 are connected with a bus having a size of m bits. The memory controller 910 and the memory 920 are connected with a bus having a size of n bits. In a case of constructing the memory with SDRAMS, m is equal to n. In addition, in a case of constructing the memory with DDR-SDRAMs, m is equal to 2n because the DDR-SDRAM may perform data accessing two times for one clock cycle.

FIGS. 10A and 10B show operations of accessing the memory 920 shown in FIG. 9 in detail. When the decoder core 900 accesses the data 1000, 1002, 1004, and 1006 having a predetermined size in the respective memory banks 922, 924, 926, 928, the memory controller 910 transmits addresses 1020, 1022, 1024, and 1026 of the positions, where the to-be-accessed data is located, to the respective memory banks 922, 924, 926, and 928 via an address bus 1008.

The memory controller 910 transmits the address 1020 via the address bus 1008 to access the data 1000 in the memory bank (0) 922. On the other hand, for the latency before the data 1000 is accessed, the memory controller 910 sequentially transmits the addresses 1022, 1024, and 1026 to the respective memory banks (1) 924, (2) 926, and (3) 928 via the address bus 1008. As a result, all the data 1000, 1002, 1004, and 1006 stored in the memory banks (0) to (3) may be sequentially accessed without any additional latency. In other words, 4 latencies occur in a case of not using the interleaved memory bank structure. However, in a case of using the interleaved memory bank structure, all the data stored in the four memory banks may be accessed after a one-time latency.

As a result, by using the interleaved memory bank structure according to an embodiment of the present invention, additional latencies may be prevented, and all the data of the macroblocks stored in the memory after one-time latency may be accessed.

Figure 11A:
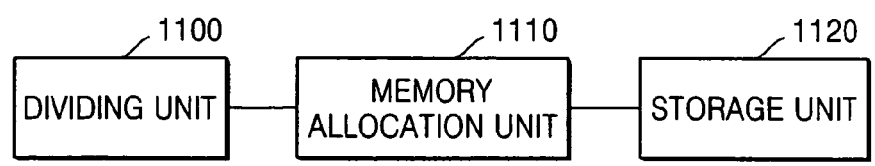
FIGS. 11A and 11B show constructions of examples of a memory mapping apparatus according to an embodiment of the present invention.

FIG. 11A illustrates a construction of an example of a memory mapping apparatus according to an embodiment of the present invention. The memory mapping apparatus comprises a dividing unit 1100, a memory allocation unit 1110, and a storage unit 1120.

Figure 2:
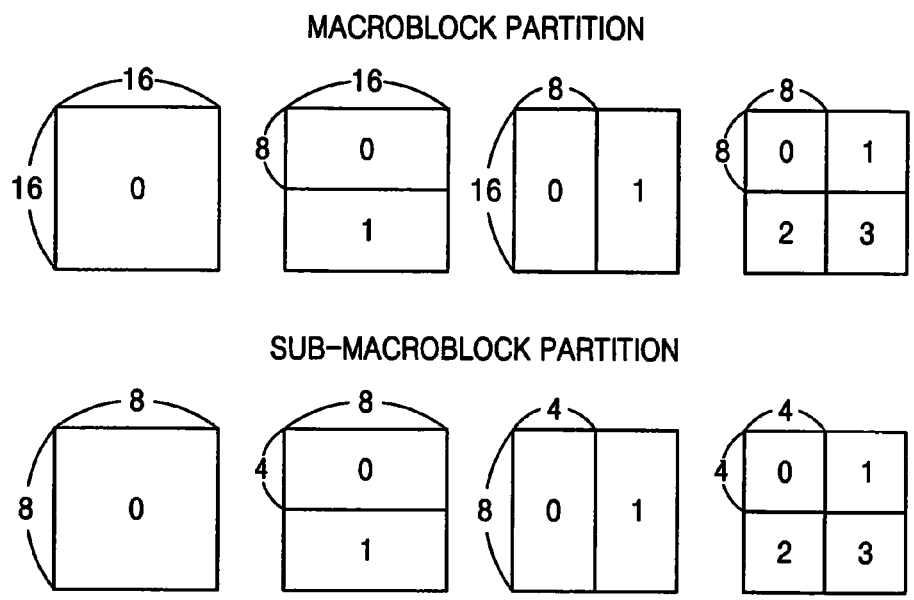
FIG. 2 shows macroblock and sub-macroblock partitions.

The dividing unit 1100 divides picture data into macroblocks, which are used as units of encoding. Typically, the macroblock has a size of 16×16 bytes. The macroblock is described above with reference to FIG. 2. In addition, the dividing unit 1100 divides each of the macroblocks into partitions having a predetermined size. The predetermined size of the partitions is equal to a data size which is consecutively accessible after a one-time address request in a burst mode. For example, in a case where a 64-bit (8-byte) data bus and the burst mode of FIG. 3A are used, a partition size is 8 bytes. In addition, in case of FIG. 3B, a partition size is 32 bytes (8×4 bytes); and in the case of FIG. 3C, a partition size is 64 bytes (8×8 bytes).

In addition, the dividing unit 1100 designates the macroblocks and the partitions as indexes to identify the macroblocks and the partitions of the picture data. For example, after dividing the picture data into the macroblocks, the dividing unit 1100 sequentially designates the macroblocks as indexes of 0 to N-1 in an order of from top to bottom and from left to right of the picture data. In addition, the dividing unit 1100 designates the partitions as indexes of 0 to N-1 according to an order of the corresponding memory banks.

In addition, the dividing unit 1100 divides the picture data frame-by-frame or field-by-field depending on the picture data encoding scheme: frame encoding; or field encoding. The dividing of the picture data in the frame-by-frame or field-by-field manner will be described later with reference to FIGS. 22A and 22B.

The storage unit 1120 comprises a plurality of independently-accessible memory banks. The structure of the memory bank is described above with reference to FIGS. 9 and 10A. As shown in FIG. 10A, each of the memory banks independently receives an address and outputs data located in a position corresponding to the address. Therefore, as shown in FIG. 10B, data block located in plural memory banks may be accessed after a one-time latency. Here, the storage unit 1120 stores the data to the memory banks in units of a partition.

Figure 14:
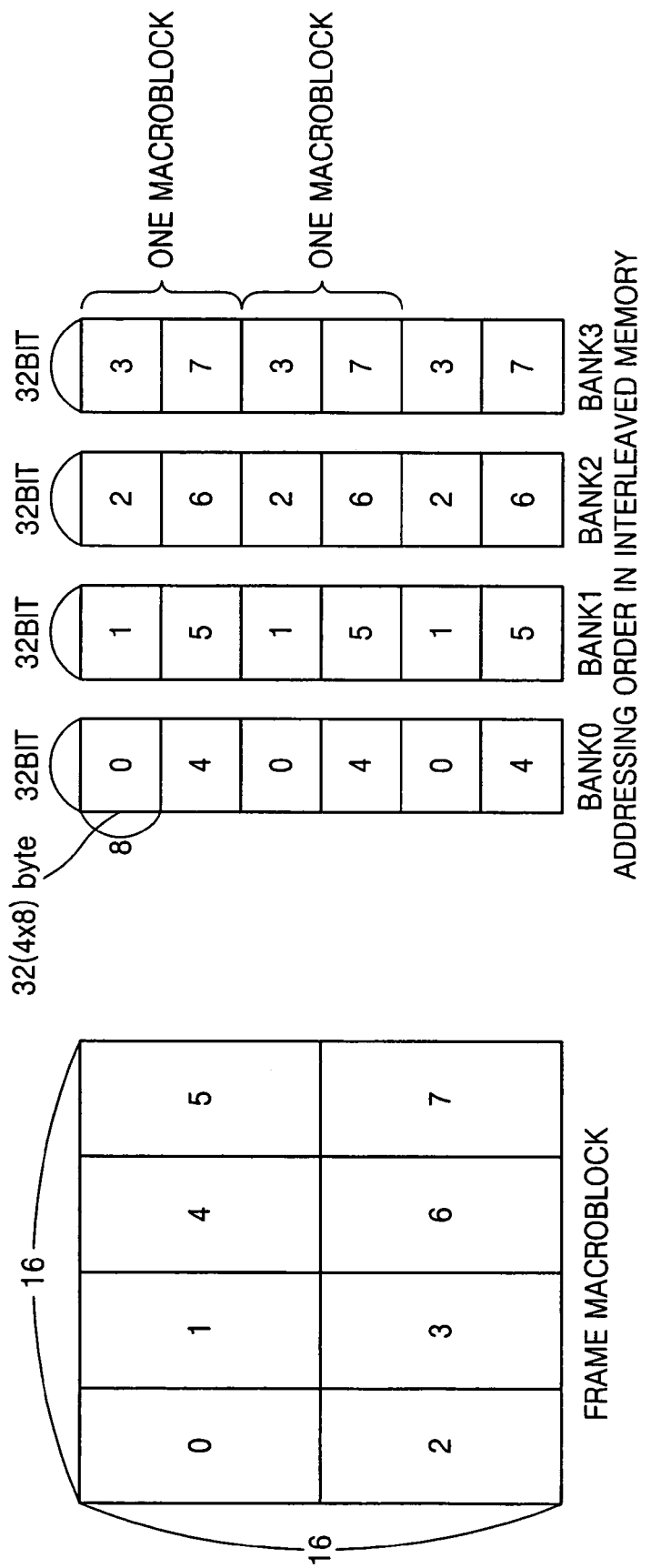
FIG. 14 shows an example of a method of mapping frame luma data into a memory.

The memory allocation unit 1110 allocates the partitions in each of the macroblocks to the corresponding memory banks. More specifically, the memory allocation unit 1110 allocates adjacent partitions to different memory banks. For example, as shown in FIG. 14, the partitions 1 and 2 adjacent to the partition 0 are allocated to the memory banks different from the memory bank 0 to which the partition 0 is allocated. The allocation of partitions will be described later in detail with reference to FIGS. 14 to 21.

In addition, the memory allocation unit 1110 generates and manages an address correspondence lookup table representing a correspondence between the partitions and addresses of the memory banks. More specifically, the memory allocation unit 1110 generates and manages the address correspondence lookup table representing a correspondence between the indexes of the macroblocks and partitions and the addresses of the memory banks. When a decoder or encoder writes or reads data at a predetermined position of the picture data to or from the memory bank, a real address of the memory bank may be obtained by using the address correspondence lookup table.

Figure 11B:
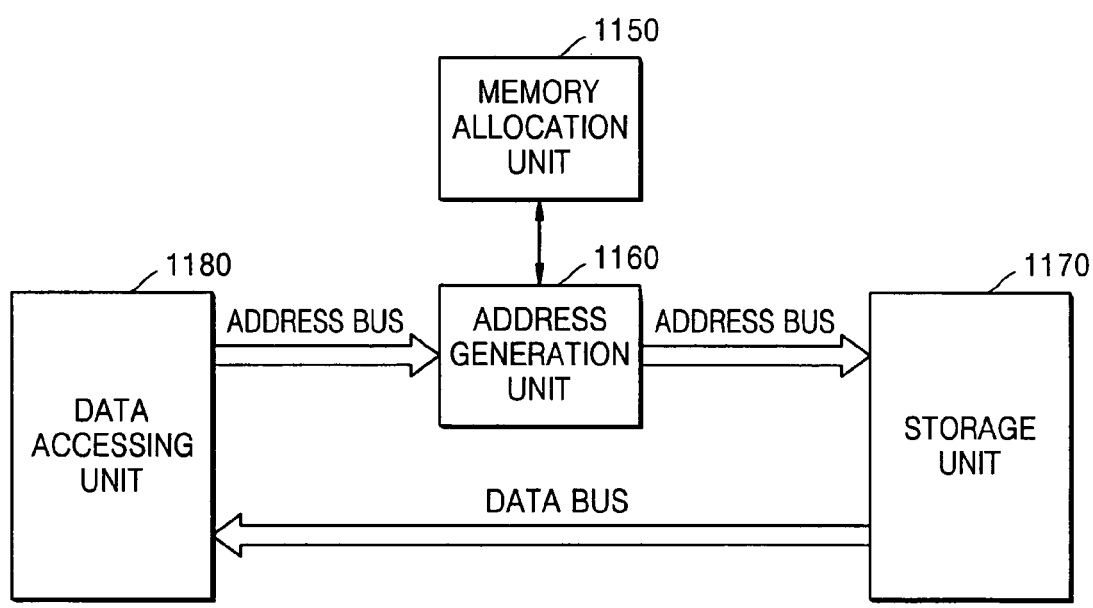

FIG. 11B shows a construction of another example of a memory mapping apparatus according to an embodiment of the present invention. The memory mapping apparatus comprises a memory allocation unit 1150, an address generation unit 1160, a storage unit 1170, and a data accessing unit 1180.

Since the memory allocation unit 1150 and the storage unit 1170 are the same as the memory allocation unit 1110 and the storage unit 1120 of FIG. 11A, the description on the memory allocation unit 1150 and the storage unit 1170 is omitted.

When the data accessing unit 1180 writes or reads the data at a predetermined position (x, y) of the picture data to or from the storage unit 1170, the data accessing unit 1180 requests an address of the memory bank corresponding to the data at the predetermined position (x, y) from the address generation unit 1160.

Next, the address generation unit 1160 generates the address of the memory bank of the storage unit 1170 storing the data at the predetermined position (x, y). Since the data is accessed in the burst mode in units of not a pixel, but a partition which is a one-time accessible data unit, it is necessary to obtain an address of the memory bank storing the partition where the pixel data at the predetermined position (x, y) is located.

More specifically, the address generation unit 1160 retrieves an index of the macroblock including the pixel data at the predetermined position (x, y). Next, the address generation unit 1160 obtains a region of the partition, which is the one-time accessible data unit, including the pixel data at the predetermined position (x, y), and retrieves the macroblocks where the region of the partition belongs. For example, if the size of the partition is 4×8 bytes, the address generation unit 1160 obtains a rectangular region having a size of 4×8 bytes (horizontal length×vertical length) around the position (x, y). Next, the address generation unit 1160 obtains indexes of the macroblocks and partitions belonging to the rectangular region. Finally, the address generation unit 1160 obtains a real address of the memory bank based on the indexes of the macroblocks and partitions by using the address correspondence lookup table of the memory allocation unit 1150.

If the data at the predetermined position (x, y) of the picture data is needed, the data accessing unit 1180 obtains the real address corresponding to the predetermined position (x, y) from the address generation unit 1160. Next, the data accessing unit 1180 requests and receives the data from the storage unit 1170 based on the real address. In this case, since adjacent partitions are stored in different memory banks as shown in FIG. 10B, data blocks stored in plural memory banks may be accessed after a one-time latency.

The data accessing unit 1180 may be a part of an encoder to encode the picture data, a decoder to decode the picture data, and other modules to process the picture data.

FIG. 12 is a flowchart showing an example of a memory mapping method according to an embodiment of the present invention. The dividing unit 1100 divides the picture data into the macroblocks (S1200). Next, the dividing unit 1100 divides each of the macroblocks into the partitions which are data transmission units in the burst mode (S1210)

The memory allocation unit 1110 allocates adjacent partitions to different memory banks (S1220). In addition, the memory allocation unit 1110 generates and manages an address correspondence lookup table representing a correspondence between the partitions and addresses of the memory banks (S1230).

Figure 13:
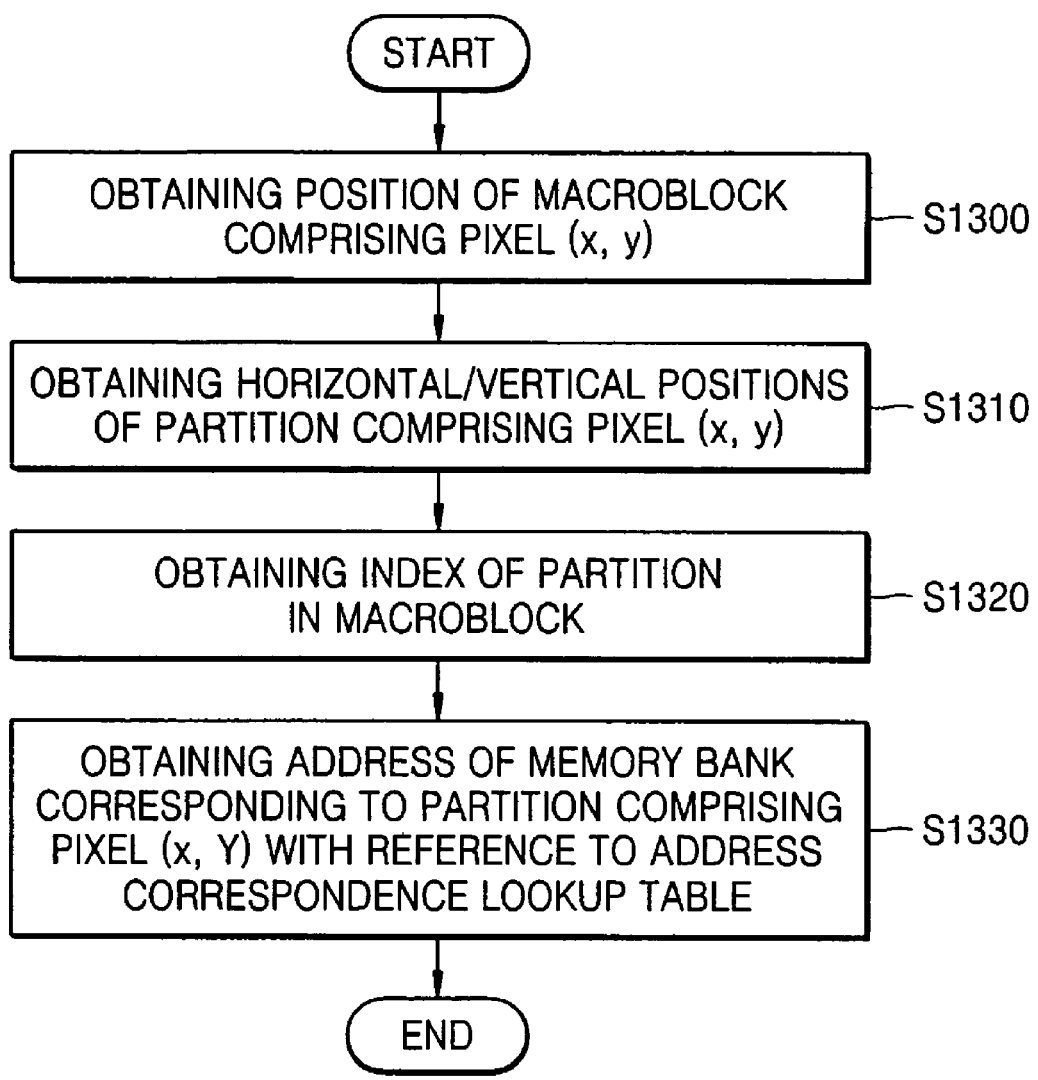

FIG. 13 is a flowchart showing another example of a memory mapping method according to an embodiment of the present invention. The address generation unit 1160 obtains positions of the macroblocks including the data at the predetermined position of the picture data which is written or read to or from the storage unit 1170 (S1300). Next, the address generation unit 1160 obtains the region of the partition including the pixel data at the predetermined position (S1310) and retrieves the macroblock where the region of the partition belongs (S1320). Next, the address generation unit 1160 obtains a real address of the memory bank based on the indexes of the macroblocks and partitions by using the address correspondence lookup table (S1330).

In examples shown in FIGS. 14 to 21, it is assumed that the picture data is encoded in units of a 16×16-byte macroblock, a size of a partition which is a data transmission unit in the burst mode is 64 bits (8 bytes; FIG. 3B), and the memory comprises four memory banks (FIGS. 9 and 10A).

FIG. 14 shows an example of a method of mapping frame luma data into a memory frame-by-frame. In the burst mode, a 64-bit data bus is used. The burst mode is shown in FIG. 3B. Therefore, the size of the partition which is an accessible unit in the burst mode is 4×8 bytes. As a result, one macroblock is divided into eight partitions.

Each of the eight partitions corresponds to a storage unit comprising four memory banks. Adjacent partitions are allocated to different memory banks. More specifically, when a partition 0 corresponds to a memory bank 0, partitions 1 and 2 adjacent to the partition 0 correspond to memory banks 1 and 2, which are different from the memory bank 0, respectively.

Figure 15:
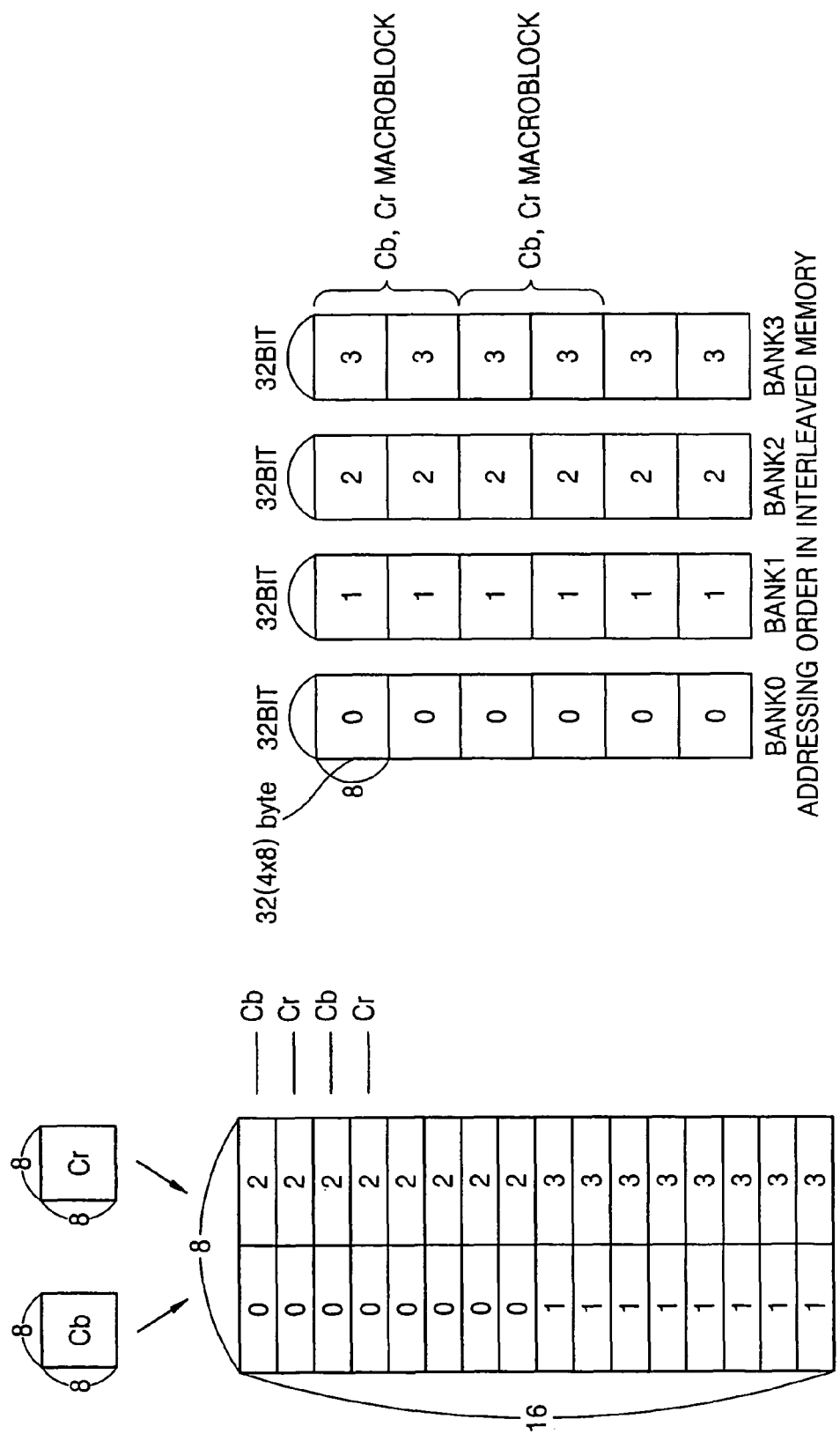
FIG. 15 shows an example of a method of mapping frame chroma data into a memory.

FIG. 15 shows an example of a method of mapping frame chroma data into a memory frame-by-frame. In a case of displaying a picture in a 4:2:0 chroma sampling manner, Cb and Cr components having a size of 8×8 bytes are interleaved line by line as shown in FIG. 15. As a result, an 8×16-byte block is obtained. The dividing unit divides the 8×16-byte block into 4×8-byte partitions. Next, the memory allocation unit allocates adjacent partitions to different memory banks.

Figure 16:
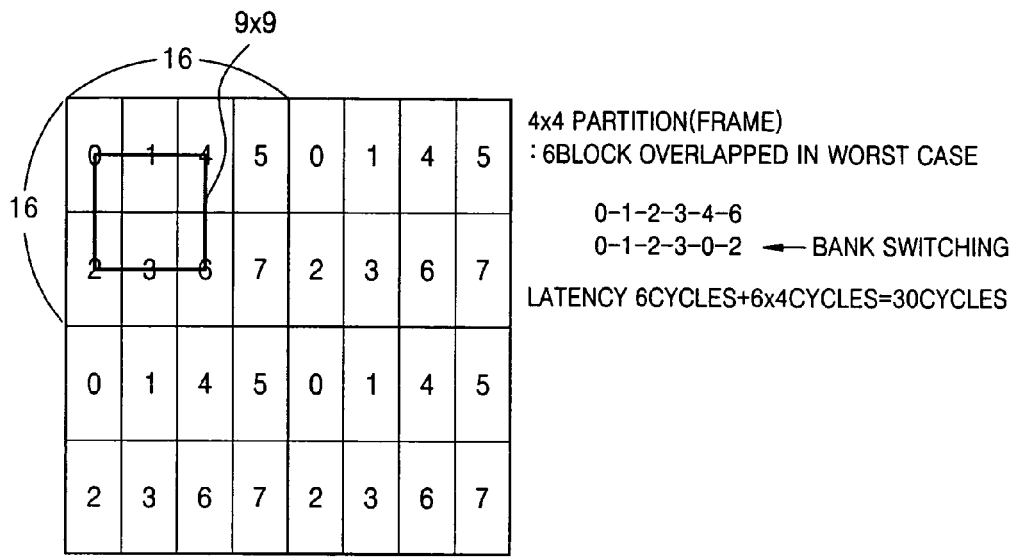
FIG. 16 shows an example of a method of accessing a reference block having a frame structure to perform frame-by-frame motion prediction compensation in a frame-by-frame memory mapping method according to an embodiment of the present invention.

FIG. 16 shows an example of a method of accessing a reference block having a frame structure by a video decoder to perform frame-by-frame motion prediction compensation on a 4×4-byte partition in a frame-by-frame memory mapping method according to an embodiment of the present invention.

In the H.264 standard, a 6-tap filter is used. Therefore, a size of a block which is accessed by the decoder to perform the motion prediction compensation on the 4×4-byte partition is 9×9 bytes. In addition, the boundaries of macroblocks or partitions may not accurately comply with the to-be-accessed regions due to a motion vector. Therefore, in the worst case scenario shown in FIG. 16, 6 partitions must be accessed.

Figure 6:
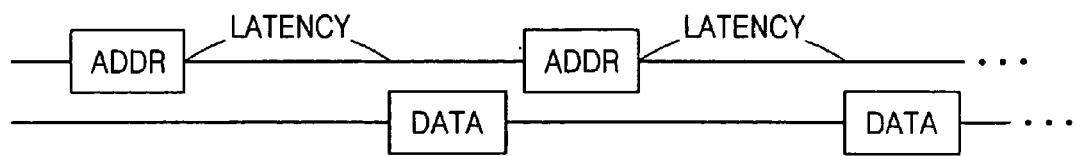

In FIG. 16, the decoder must access all the partitions 0, 1, 2, 3, 4, and 6 to perform the motion prediction compensation. In this case, all the memory banks are accessed in the order of the memory banks 0, 1, 2, 3, 0, and 2. Since adjacent partition correspond to different memory banks as shown in FIG. 14, it is possible to access data block stored in the memory banks 0, 1, 2, 3, 0, and 2 after a one-time latency. As a result, in the example of FIG. 6, since one memory bank is not consecutively accessed, all the partitions may be accessed after a one-time latency.

For example, if the latency is of 6 cycles, it takes 30 cycles to perform the motion prediction compensation on the 4×4-byte block.

Figure 17:
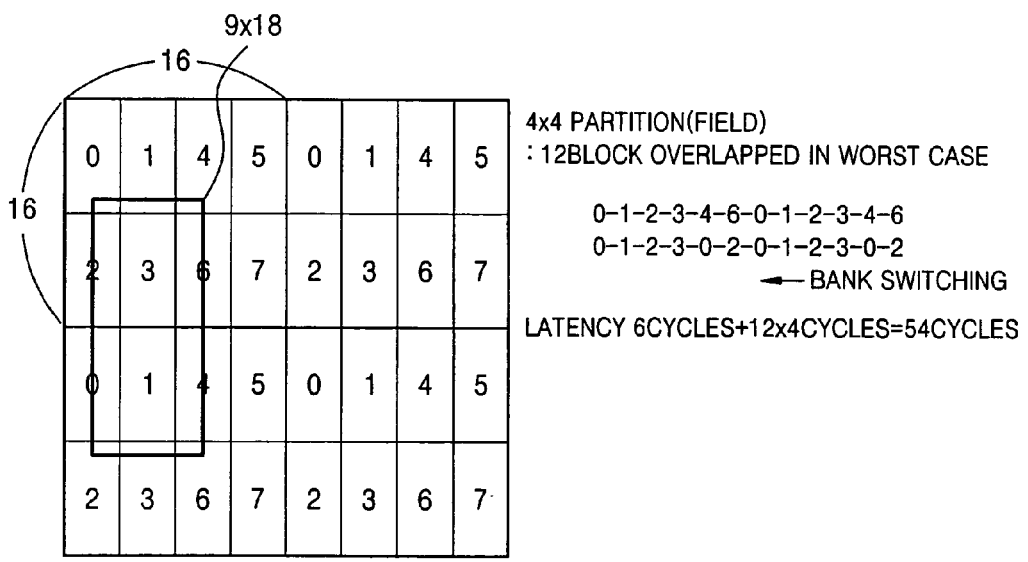
FIG. 17 shows an example of a method of accessing a reference block having a field structure to perform field-by-field motion prediction compensation in a frame-by-frame memory mapping method according to an embodiment of the present invention.

FIG. 17 shows an example of a method of accessing a reference block having a field structure by a video decoder to perform field-by-field motion prediction compensation on a 4×4-byte partition in a frame-by-frame memory mapping method according to an embodiment of the present invention.

The decoder accesses only one out of the even and odd field data of the picture data to perform the field-by-field motion prediction compensation. Therefore, the reference region necessary to perform the field-by-field motion prediction compensation has a size of 9×18 bytes, which has twice a vertical length of 9×8 bytes. In addition, in the worst case shown in FIG. 17, 12 partitions must be accessed.

In FIG. 17, the partitions subject to the motion prediction compensation on the 4×4-byte partitions are the partitions 0, 1, 2, 3, 4, 6, 0, 1, 2, 3, 4, and 6. In this case, the corresponding memory banks are accessed in the order of memory banks 0, 1, 2, 3, 0, 2, 0, 1, 2, 3, 0, and 1. In the field-by-field motion prediction compensation, a one-time latency occurs. If the latency is of 6 cycles, it takes 54 cycles (6 cycles for the one-time latency+12×4 cycles) to perform the field-by-field motion prediction compensation.

Figure 18:
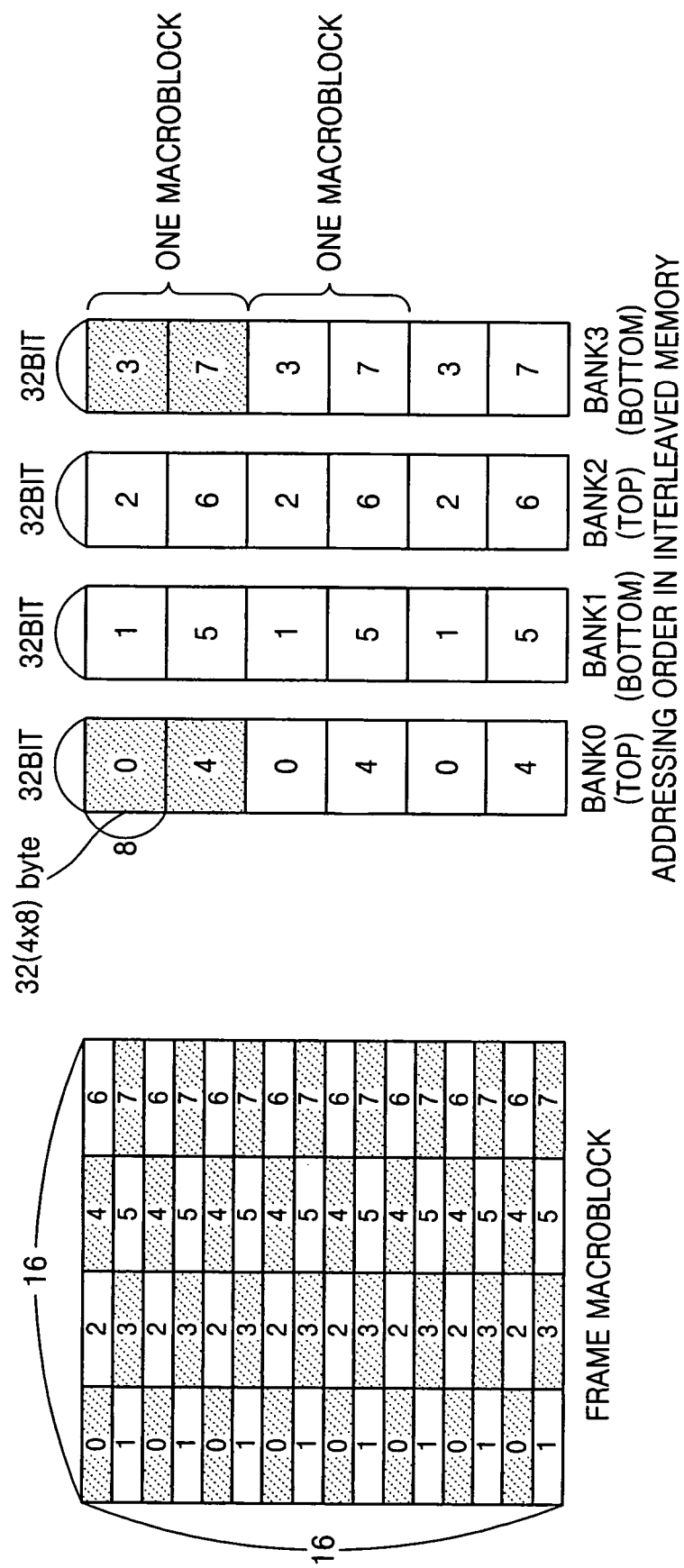
FIG. 18 shows an example of a method of mapping field luma data into a memory.

FIG. 18 illustrates an example of a method of mapping field luma data into a memory. The picture data is divided into 4×8-byte partitions by grouping field data having the same parity. Since small blocks having such a size as 4×4 bytes need to be also accessed in the H.264 standard, the picture data is divided into the smallest blocks among blocks having a size of larger than 4×4 bytes, that is, 4×8-byte blocks, as shown in FIG. 18. In this example, one macroblock is divided into 8 partitions.

To allocate adjacent partitions to different memory banks, the memory banks 0 and 2 correspond to even fields (or top field), and the memory banks 1 and 3 correspond to odd fields (or bottom fields).

Figure 19:
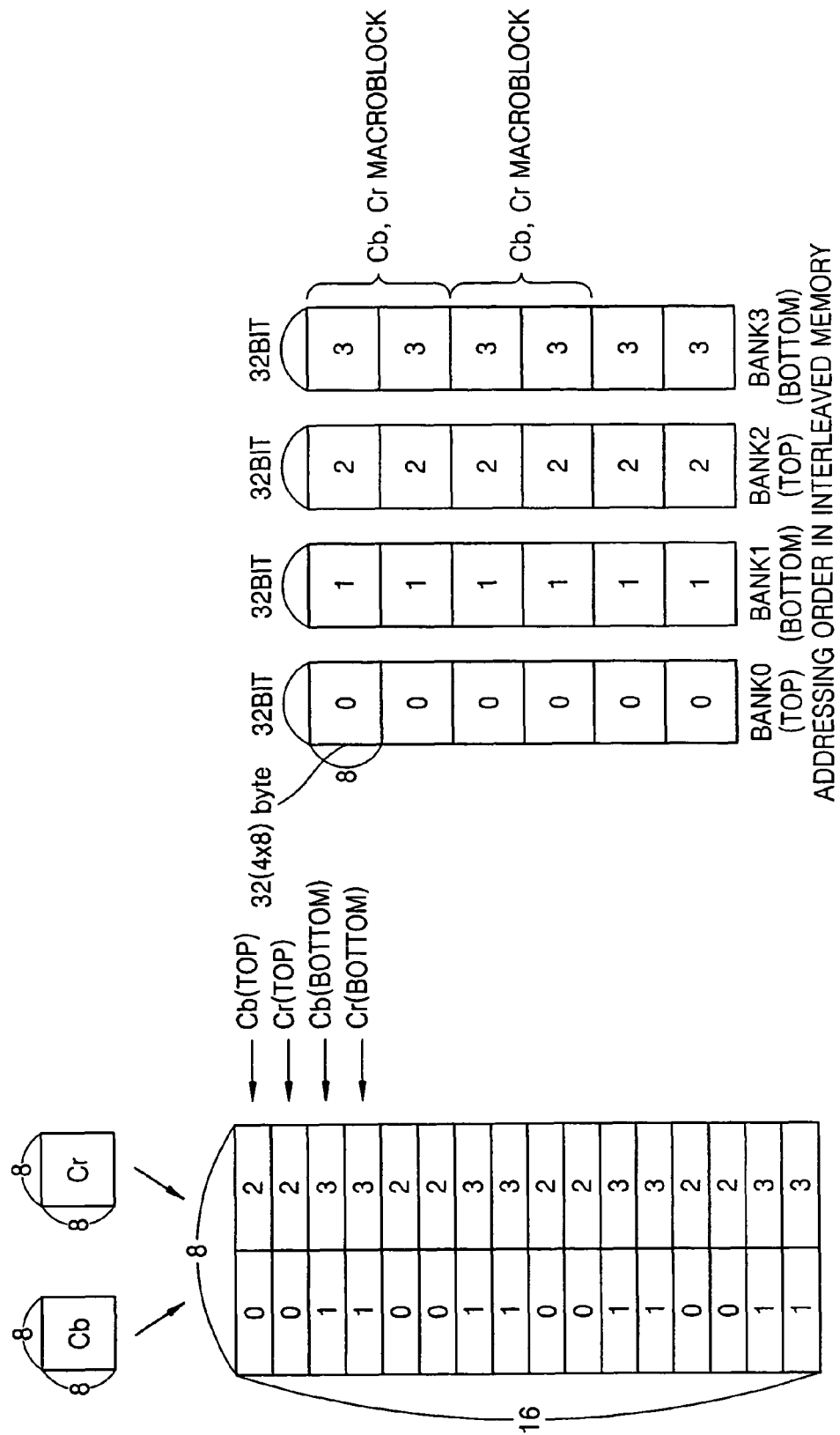
FIG. 19 shows an example of a method of mapping field chroma data into a memory.

FIG. 19 shows an example of a method of mapping field chroma data into a memory. In a case of displaying a picture in a 4:2:0 chroma sampling manner, Cb and Cr components having a size of 8×8 bytes are interleaved line by line as shown in FIG. 19. Since the Cb and Cr components are allowed to access the same position, the Cb and Cr components are constructed in the interlace scanning manner.

Figure 20:
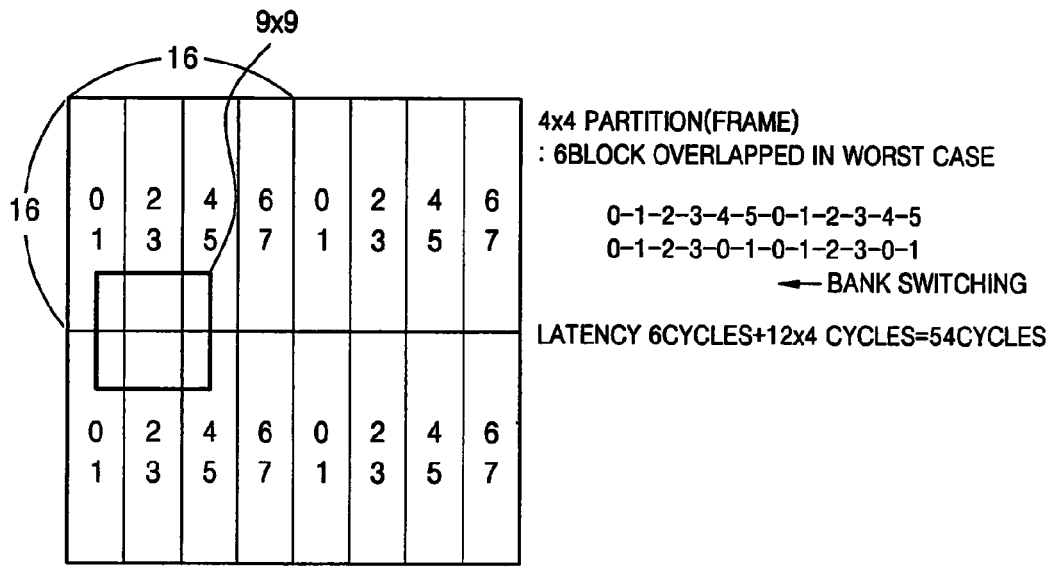
FIG. 20 shows an example of a method of accessing a reference block having a frame structure to perform frame-by-frame motion prediction compensation in a field-by-field memory mapping method according to an embodiment of the present invention.

FIG. 20 shows an example of a method of accessing a reference block having a frame structure by a video decoder to perform frame-by-frame motion prediction compensation on a 4×4-byte partition in a field-by-field memory mapping method according to an embodiment of the present invention.

In the H.264 standard, a 6-tap filter is used. Therefore, a size of a block which is accessed by the decoder to perform the motion prediction compensation on the 4×4-byte partition is 9×9 bytes. In addition, the boundaries of macroblocks or partitions may not accurately comply with the to-be-accessed regions due to a motion vector. Therefore, in the worst case scenario shown in FIG. 20, 12 partitions must be accessed.

Unlike FIG. 16, the partitions are obtained in a field-by-field manner shown in FIG. 18 and mapped into the corresponding memory banks, so that the number of the partitions increases in comparison with the case of FIG. 16. Referring to FIG. 20, the partitions subject to the motion prediction compensation on the 4×4-byte partitions are the partitions 0,1,2, 3,4,5,0,1,2,3,4, and 5. In this case, the corresponding memory banks are accessed in the order of the memory banks 0, 1, 2, 3, 0, 1, 0, 1, 2, 3, 0, and 1. Since adjacent partitions are allocated to different memory banks, an occurrence of latency may be reduced as in the example of FIG. 10.

In the example shown in FIG. 20, a one-time latency occurs. If the latency is of 6 cycles, it takes 54 cycles (6 cycles for the one-time latency+12×4 cycles) to perform the field-by-field motion prediction compensation.

Figure 21:
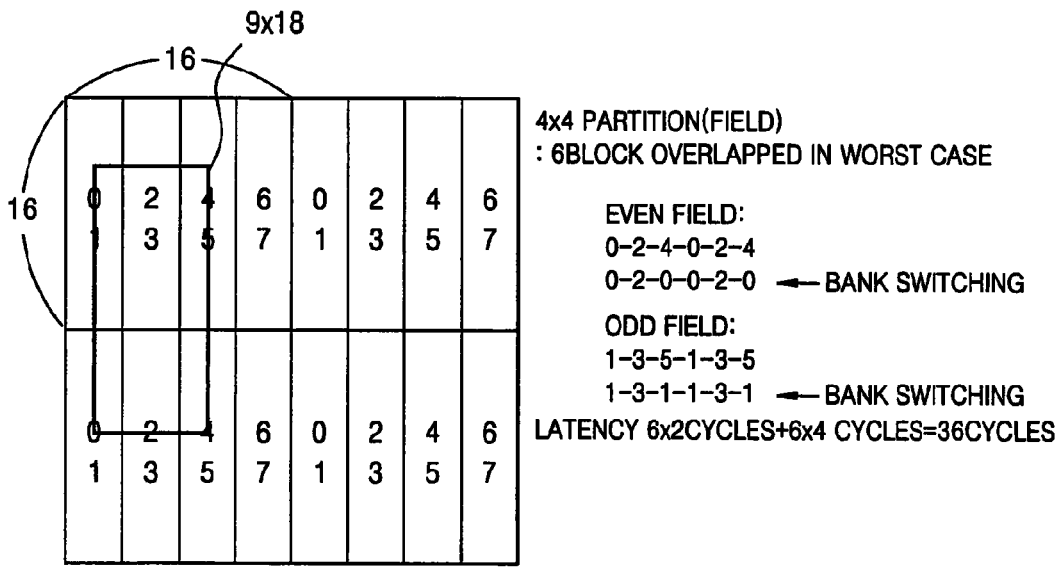
FIG. 21 shows an example of a method of accessing a reference block having a field structure to perform field-by-field motion prediction compensation in a field-by-field memory mapping method according to an embodiment of the present invention.

FIG. 21 illustrates an example of a method of accessing a reference block having a field structure by a video decoder to perform field-by-field motion prediction compensation on a 4×4-byte partition in a field-by-field memory mapping method according to an embodiment of the present invention.

The decoder access only one out of the even and odd field data of the picture data to perform the field-by-field motion prediction compensation. Therefore, the reference region necessary to perform the field-by-field motion prediction compensation has a size of 9×18 bytes, which has twice a vertical length of 9×8 bytes. In addition, the boundaries of macroblocks or partitions may not accurately comply with the to-be-accessed regions due to a motion vector. As a result, in the worst case scenario shown in FIG. 21, 6 partitions must be accessed by the decoder to perform the motion prediction compensation on the 4×4-byte partition.

In FIG. 21, the partitions subject to the motion prediction compensation on the even fields are partitions 0, 2, 4, 0, 2, and 4. In this case, the corresponding memory banks are accessed in the order of the memory banks 0, 2, 0, 0, 2, and 0. Since the adjacent partitions are allocated to different memory banks, a one-time latency occurs at the time of starting accessing the partitions. In addition, since the two banks 0 are consecutively accessed in the course of accessing the partitions, an additional latency occurs. Therefore, if the latency is of 6 cycles, it takes 36 cycles (6×2+6×4 cycles) to perform the motion prediction compensation on the 4×4-byte blocks.

In a case of accessing the odd fields, the partitions are accessed in the order of the partitions 1, 3, 5, 1, 3, and 5. The corresponding memory banks are accessed in the order of the memory banks 1, 3, 1, 1, 3, and 1. Similarly to the case of accessing the even fields, a one-time latency occurs at the time of starting accessing the partitions, and an additional latency occurs because the two memory banks 0 are consecutively accessed in the course of accessing the partitions. Therefore, like the case of accessing the even fields, it takes 36 cycles to perform the motion prediction compensation in the case of accessing the odd fields.

Referring to FIGS. 14 to 21, it may be understood that it is efficient to divide the data into field or frame partitions in cases of accessing the data frame-by-frame or field-by-field, respectively, and allocate the partitions to the corresponding memory banks. Examples of a memory mapping apparatus and a method to embody the features of the present invention will be described in detail with reference to FIGS. 22A and 22B.

Figure 22A:
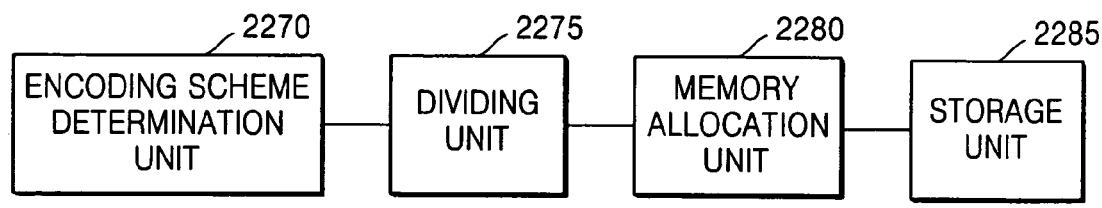
FIG. 22A shows a construction of another example of a memory mapping apparatus according to an embodiment of the present invention.

FIG. 22a shows a construction of another example of a memory mapping apparatus according to an embodiment of the present invention. The memory mapping apparatus comprises an encoding scheme determination unit 2270, a dividing unit 2275, a memory allocation unit 2280, and a storage unit 2285.

Since the storage unit 2285 is the same as the storage unit of FIG. 11A, the description is omitted.

The encoding scheme determination unit 2270 determines the encoding scheme of the picture data. The encoding scheme includes a frame encoding scheme and a field encoding scheme.

The dividing unit 2275 divides the picture data into macroblocks. When the encoding scheme determined by the encoding scheme determination unit 2270 is the frame encoding scheme, the dividing unit 2275 divides each of the macroblocks into frame partitions (see FIGS. 14 and 15). On the other hand, when the encoding scheme determined by the encoding scheme determination unit 2270 is the field encoding scheme, the dividing unit 2275 divides each of the macroblocks into field partitions (see FIGS. 18 and 19).

The memory allocation unit 2280 allocates the frame or field partitions to the corresponding memory banks of the storage unit 2285. In the memory allocation unit 2280, adjacent partitions are allocated to different memory banks.

Figure 22B:
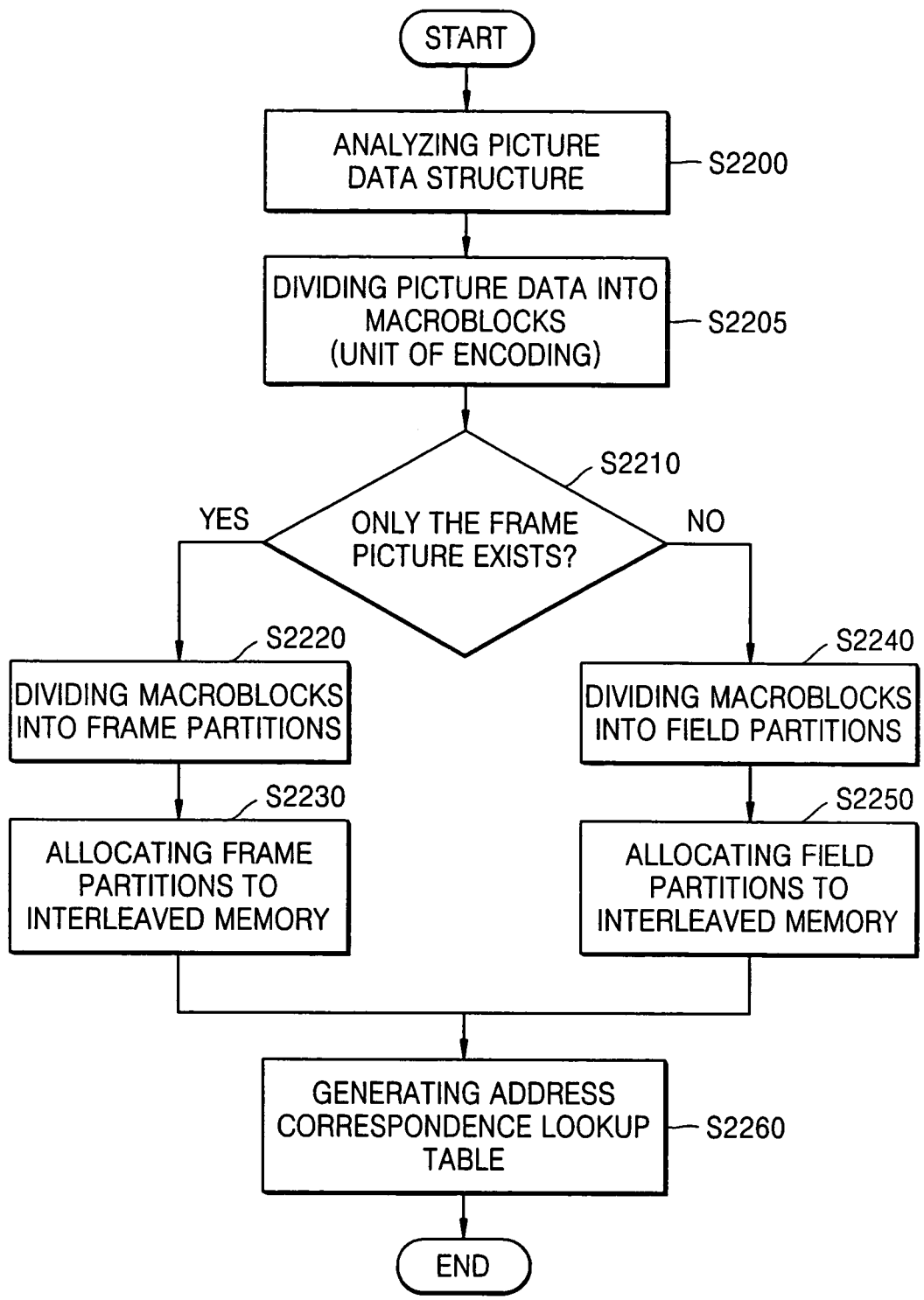
FIG. 22B is a flowchart showing another example of a memory mapping method according to an embodiment of the present invention.

FIG. 22B is a flowchart showing another example of a memory mapping method according to an embodiment of the present invention. The encoding scheme determination unit 2270 determines the encoding scheme of the picture data (S2200). More specifically, the encoding scheme determination unit 2270 determines whether only the frame data exists in the encoded picture data. Here, the frame data comprises even and odd fields. In addition, if only the frame-by-frame motion prediction compensation is performed, it is determined that only the frame data exists.

The dividing unit 2275 divides the picture data into macroblocks, which is are units of encoding the picture data, to apply the picture data to a block-based video prediction encoder (S2205). When only the frame data exists in the picture data (S2210), the dividing unit 2275 divides each of the macroblocks into frame partitions like the examples of FIGS. 14 and 15 (S2220). The memory allocation unit 2280 allocates the frame partitions to the corresponding memory banks of the storage unit 2280 (S2230). In this case, in the memory allocation unit 2280, adjacent partitions are allocated to different memory banks.

On the other hand, when the field-by-field motion prediction compensation is performed, the dividing unit 2275 divides each of the macroblocks into field partitions like the examples of FIGS. 18 and 19 (S2240). The memory allocation unit 2280 allocates the field partitions to the corresponding memory banks of the storage unit 2280 (S2250). In this case, in the memory allocation unit 2280, adjacent partitions are allocated to different memory banks.

In addition, after allocating the frame or field partitions to the corresponding memory banks, the memory allocation unit 2280 generates and manages an address correspondence lookup table representing a correspondence between the partitions and addresses of the memory banks (S2260). Therefore, in a decoder or encoder, a real address of the memory bank may be obtained by using the address correspondence lookup table.

Figure 23:
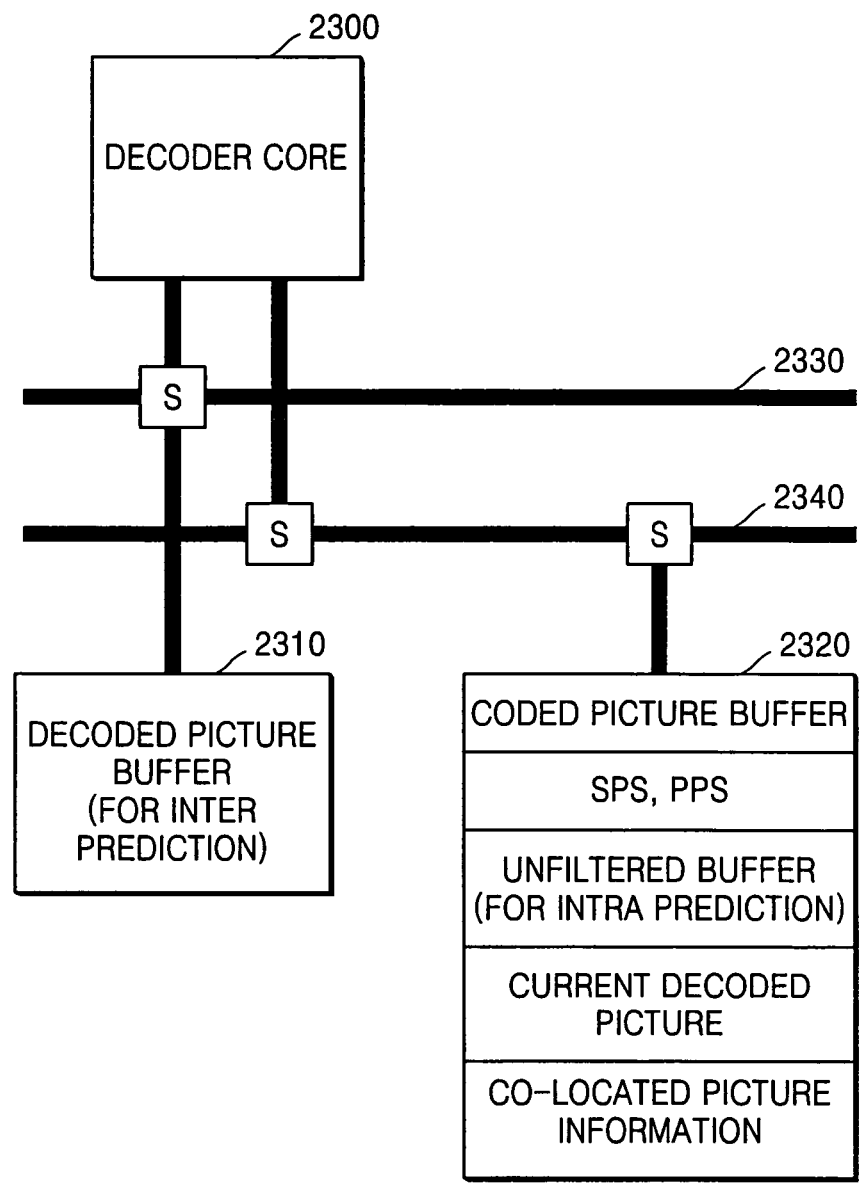
FIG. 23 shows a memory bus structure of a decoder.

FIG. 23 shows a memory bus structure of a decoder. To reduce occurrence of latency by using independently-accessible memory banks shown in FIG. 10, during the time that a given hardware module accesses a current memory, other hardware modules must not access the memory. Therefore, it is necessary to separate data requiring a large amount of memory accessing from other data and store the data in the separate memories.

Referring to FIG. 23, the decoder core 2300 is connected to two independent buses 2310 and 2320 via two respective buses 2330 and 2340. Here, former restored picture data requiring a large amount of memory accessing for a motion prediction compensation is separated from other data and stored in a separate memory 2310. As a result, during the time that the decoder core 2300 accesses the past restored picture data for the motion prediction compensation, other necessary data stored in the other memory 2320 may be accessed.

FIG. 24 show a comparison of a memory mapping method according to an embodiment of the present invention with a conventional memory mapping method in terms of the total number of cycles necessary to perform motion prediction compensation.

More specifically, FIG. 24 shows the total number of cycles necessary to perform the motion prediction compensation on the partitions having a size ranged from 4×4 to 16×16 bytes. As shown in the figure, it may be understood that the total cycles is effectively reduced according to the memory mapping method of an embodiment of the present invention.

According to the present invention, it is possible to reduce by about a half a total number of cycles necessary to write or read data for motion prediction compensation in a decoder or encoder by using a particular memory bank structure. In addition, according to an embodiment of the present invention, since each of macroblocks is divided into frame or field partitions depending on whether the motion prediction compensation is frame-by-frame or field-by-field motion prediction compensation and adjacent partitions are allocated to different memory banks, it is possible to reduce the total number of cycles necessary to read the data for the motion prediction compensation in the decoder.

The present invention may also be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A memory mapping apparatus in a video decoder/encoder, comprising:
   a dividing unit dividing picture data into macroblocks and dividing each of the macroblocks into partitions having a size of accessible data in a one-time address request in a burst mode, each macroblock being a unit of encoding;
   a storage unit comprising at least two memory banks, each of the memory banks being independently accessible;
   a memory allocation unit allocating adjacent partitions to different memory banks; and
   a memory controller transmitting addresses of to-be accessed data to respective memory banks sequentially for a latency before the data is accessed, wherein after transmitting the addresses, the data in each of the memory banks is accessed sequentially without an additional latency,
   wherein the size of accessible data is dynamically determined based on an encoding scheme of the picture data.

2. The memory mapping apparatus according to claim 1, wherein the memory allocation unit generates and manages an address correspondence lookup table representing a correspondence between the partitions and addresses of the memory banks.

3. The memory mapping apparatus according to claim 1, wherein the predetermined size of the partitions divided from each of the macroblocks by the dividing unit is equal to a data size, wherein each of the macroblocks is consecutively accessible after the one-time address request in the burst mode.

4. The memory mapping apparatus according to claim 1, wherein the dividing unit divides the picture data into 16×16-byte macroblocks and divides each of the macroblocks into 4×8-byte partitions.

5. The memory mapping apparatus according to claim 1, wherein the storage unit comprises four memory banks, and
   wherein each of the memory banks is independently data readable and writable.

6. The memory mapping apparatus according to claim 1, wherein the dividing unit forms the picture data by arraying the Cb and Cr components of chroma data in an interlace scanning manner, divides the picture data into the macroblocks, and divides each of the macroblocks into the partitions having a predetermined size.

7. The memory mapping apparatus according to claim 1, wherein the dividing unit divides the picture data into first macroblocks, classifies each of the first macroblocks into odd and even fields, and divides each of second macroblocks comprising the respective fields into partitions having a predetermined size.

8. A memory mapping apparatus in a video decoder/encoder, comprising:
   an encoding scheme determination unit determining that an encoding scheme for picture data is a frame or a field encoding scheme;
   a dividing unit dividing the picture data into macroblocks which are units of encoding, dividing each of the macroblocks into frame partitions having a size of accessible data in a one-time address request in a burst mode, when the encoding scheme is the frame encoding scheme, and dividing each of the macroblocks into field partitions when the encoding scheme is the field encoding scheme;
   a storage unit comprising at least two memory banks, each of the memory banks being independently accessible;
   a memory allocation unit allocating adjacent partitions to different memory banks; and
   a memory controller transmitting addresses of to-be accessed data to respective memory banks sequentially for a latency before the data is accessed, wherein after transmitting the addresses, the data in each of the memory banks is accessed sequentially without an additional latency,
   wherein the size of accessible data is dynamically determined based on a result of the determining that the encoding scheme for picture data is a frame or a field encoding scheme.

9. The memory mapping apparatus according to claim 8, wherein the memory allocation unit generates and manages an address correspondence lookup table representing a correspondence between the partitions and the addresses of the memory banks.

10. The memory mapping apparatus according to claim 8, wherein the predetermined size of the partitions divided from each of the macroblocks by the dividing unit is equal to a data size, wherein each of the macroblocks is consecutively accessible after the one-time address request in the burst mode.

11. A memory mapping method in a video decoder/encoder, comprising:
dividing picture data into macroblocks, the macroblocks being units of encoding;
dividing, performed by at least one processing device, each of the macroblocks into partitions having a size of accessible data in a one-time address request in a burst mode;
allocating adjacent partitions into different memory banks out of at least two memory banks, each of the memory banks being independently accessible;
generating and managing an address correspondence lookup table representing a correspondence between the partitions and addresses of the memory banks; and
transmitting addresses of to-be accessed data to respective memory banks sequentially for a latency before the data is accessed, wherein after transmitting the addresses, the data in each of the memory banks is accessed sequentially without an additional latency,
wherein the size of accessible data is dynamically determined based on an encoding scheme of the picture data.

12. The memory mapping method according to claim 11, wherein the predetermined size of the partitions is equal to a data size, wherein the partitions are consecutively accessible after the one-time address request in the burst mode.

13. The memory mapping method according to claim 11, wherein the dividing of the partitions is performed by dividing each of the macroblocks into odd and even fields, and dividing each of the macroblocks into the partitions having the predetermined size based on each of the fields.

14. A memory mapping method in a decoder/encoder, comprising:
determining that an encoding scheme of picture data is a frame or a field encoding scheme;
dividing the picture data into macroblocks which are units of encoding, dividing, performed by at least one processing device, each of the macroblocks into frame partitions having a size of accessible data in a one-time address request in a burst mode, when the encoding scheme is the frame encoding scheme, and dividing each of the macroblocks into field partitions if the encoding scheme is the field encoding scheme;
allocating adjacent partitions to different memory banks; and
transmitting addresses of to-be accessed data to respective memory banks sequentially for a latency before the data is accessed, wherein after transmitting the addresses, the data in each of the memory banks is accessed sequentially without an additional latency,
wherein the size of accessible data is dynamically determined based on a result of the determining that the encoding scheme for picture data is a frame or a field encoding scheme.

15. The memory mapping method according to claim 14, further comprising generating and managing an address correspondence lookup table representing a correspondence between the partitions and the addresses of the memory banks.

16. The memory mapping method according to claim 14, wherein the predetermined size of the partitions is equal to a data size, and the partitions are consecutively accessible after the one-time address request in the burst mode.

17. A non-transitory computer readable medium having recorded thereon computer readable instructions of a memory mapping method in a video decoder/encoder, the instructions comprising:
dividing picture data into macroblocks, the macroblocks being units of encoding;
dividing each of the macroblocks into partitions having a size of accessible data in a one-time address request in a burst mode;
allocating adjacent partitions into different memory banks out of at least two memory banks, each of the memory banks being independently accessible;
generating and managing an address correspondence lookup table representing a correspondence between the partitions and addresses of the memory banks; and
transmitting addresses of to-be accessed data to respective memory banks sequentially for a latency before the data is accessed, wherein after transmitting the addresses, the data in each of the memory banks is accessed sequentially without an additional latency,
wherein the size of accessible data is dynamically determined based on an encoding scheme of the picture data.

18. The non-transitory computer readable medium according to claim 17, wherein the predetermined size of the partitions is equal to a data size, wherein the partitions are consecutively accessible after the one-time address request in the burst mode.

19. The non-transitory computer readable medium according to claim 17, wherein the dividing of the partitions is performed by dividing each of the macroblocks into odd and even fields, and dividing each of the macroblocks into the partitions having the predetermined size based on each of the fields.

20. A non-transitory computer readable medium having recorded thereon computer readable instructions of a memory mapping method in a decoder/encoder, the instructions comprising:
determining that an encoding scheme of picture data is a frame or a field encoding scheme;
dividing the picture data into macroblocks which are units of encoding, dividing each of the macroblocks into frame partitions having a size of accessible data in a one-time address request in a burst mode, when the encoding scheme is the frame encoding scheme, and dividing each of the macroblocks into field partitions when the encoding scheme is the field encoding scheme;
allocating adjacent partitions to different memory banks; and
transmitting addresses of to-be accessed data to respective memory banks sequentially for a latency before the data is accessed, wherein after transmitting the addresses, the data in each of the memory banks is accessed sequentially without an additional latency,
wherein the size of accessible data is dynamically determined based on a result of the determining that the encoding scheme for picture data is a frame or a field encoding scheme.

21. The non-transitory computer readable medium according to claim 20, further comprising generating and managing an address correspondence lookup table representing a correspondence between the partitions and the addresses of the memory banks.

22. The non-transitory computer readable medium according to claim 20, wherein the predetermined size of the partitions is equal to a data size, and the partitions are consecutively accessible after a one-time address request in a burst mode.

23. The memory mapping apparatus according to claim 5, wherein two or more bytes of the data are continuously readable or writable to the memory banks during a single latency time caused by the one-time address request.

24. The memory mapping apparatus according to claim 5, wherein all of the data is continuously readable or writable to the memory banks during the single latency time.

* * * * *